United States Patent
Yamamura

(10) Patent No.: US 8,979,336 B2
(45) Date of Patent: Mar. 17, 2015

(54) VEHICLE HEADLAMP APPARATUS

(75) Inventor: Satoshi Yamamura, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 1079 days.

(21) Appl. No.: 12/401,643

(22) Filed: Mar. 11, 2009

(65) Prior Publication Data
US 2009/0231866 A1    Sep. 17, 2009

(30) Foreign Application Priority Data
Mar. 12, 2008    (JP) ................. 2008-062672

(51) Int. Cl.
*B60Q 1/00*      (2006.01)
*B60Q 3/00*      (2006.01)
*F21S 8/10*      (2006.01)
(Continued)

(52) U.S. Cl.
CPC ................. *F21S 48/25* (2013.01); *B60Q 1/085* (2013.01); *F21S 48/1154* (2013.01); *F21S 48/1159* (2013.01); *F21S 48/1163* (2013.01); *F21S 48/1747* (2013.01); *B60Q 2300/054* (2013.01); *B60Q 2300/056* (2013.01); *B60Q 2300/41* (2013.01); *B60Q 2300/42* (2013.01); *B60Q 2300/45* (2013.01); *F21S 48/1241* (2013.01); *F21Y 2101/02* (2013.01)
USPC ........... 362/507; 362/466; 362/475; 362/487; 362/543; 362/545

(58) Field of Classification Search
USPC ......... 362/507, 509, 466, 475, 508, 543, 545, 362/800
See application file for complete search history.

(56) References Cited

U.S. PATENT DOCUMENTS 5,837,994 A * 11/1998 Stam et al. ................. 250/208.1
6,817,740 B2 * 11/2004 Kobayashi et al. ........... 362/466
(Continued)

FOREIGN PATENT DOCUMENTS

DE    102007002689 A1    9/2007
EP        2037167 A2    3/2009
(Continued)

OTHER PUBLICATIONS

Extended European Search Report issued on Feb. 22, 2011 in the corresponding European Patent Application No. 09003562.7.
(Continued)

*Primary Examiner* — Karabi Guharay
*Assistant Examiner* — Jessica M Apenteng
(74) *Attorney, Agent, or Firm* — Sughrue Mion, PLLC

(57) ABSTRACT

A vehicle headlamp apparatus is provided. The vehicle headlamp apparatus includes a lamp unit, a first additional lamp unit which forms a first light distribution pattern, a second additional lamp unit which forms a second light distribution pattern overlapping with the first light distribution pattern, and a controller. The first light distribution pattern includes at least one first partial region, and the first additional lamp unit adjusts a luminous intensity of a light to be irradiated toward the first partial region. The second light distribution pattern includes at least one second partial region which partially overlaps with the first partial region, and the second additional lamp unit adjusts a luminous intensity of a light to be irradiated toward the second partial region. The controller controls the first additional lamp unit and the second additional lamp unit to adjust the luminous intensity of the partial regions.

20 Claims, 17 Drawing Sheets

(51) Int. Cl.
    *B60Q 1/08*    (2006.01)
    *F21Y 101/02*      (2006.01)

(56) References Cited

U.S. PATENT DOCUMENTS

| | | | | |
|---|---|---|---|---|
| 7,168,837 | B2* | 1/2007 | Ishida et al. | 362/539 |
| 7,258,474 | B2* | 8/2007 | Valcamp et al. | 362/545 |
| 7,387,416 | B2* | 6/2008 | Tsukamoto et al. | 362/518 |
| 7,503,679 | B2* | 3/2009 | Godbillon | 362/522 |
| 7,677,777 | B2* | 3/2010 | Woodward et al. | 362/511 |
| 2003/0026107 | A1* | 2/2003 | Toda et al. | 362/545 |
| 2004/0090602 | A1* | 5/2004 | Imade | 353/102 |
| 2004/0196663 | A1* | 10/2004 | Ishida et al. | 362/539 |
| 2005/0122735 | A1 | 6/2005 | Watanabe et al. | |
| 2005/0195613 | A1* | 9/2005 | Morishita | 362/507 |
| 2007/0086202 | A1 | 4/2007 | Tsukamoto et al. | |
| 2007/0201241 | A1* | 8/2007 | Komatsu | 362/545 |
| 2008/0025037 | A1* | 1/2008 | Chinniah et al. | 362/545 |
| 2008/0130302 | A1* | 6/2008 | Watanabe | 362/466 |
| 2008/0144326 | A1* | 6/2008 | Watanabe | 362/466 |
| 2008/0316759 | A1* | 12/2008 | Valcamp et al. | 362/507 |
| 2009/0046474 | A1* | 2/2009 | Sato et al. | 362/466 |

FOREIGN PATENT DOCUMENTS

| | | |
|---|---|---|
| JP | 4-81337 A | 3/1992 |
| JP | 2004-231178 A | 8/2004 |
| JP | 2006-32115 A | 2/2006 |
| JP | 2006-188224 A | 7/2006 |
| JP | 2008-37240 A | 2/2008 |

OTHER PUBLICATIONS

Office Action dated Aug. 28, 2012, issued by the Japanese Patent Office in counterpart Japanese Application No. 2008-062672.

* cited by examiner

| FIRST POSITION | SECOND POSITION | THIRD POSITION | FOURTH POSITION | FIFTH POSITION |
|---|---|---|---|---|

PA11, PA12, PA13, PA14, PA15

PA

VEHICLE HEADLAMP APPARATUS

CROSS-REFERENCE TO RELATED APPLICATION

The present application claims priority from Japanese Patent Application No. 2008-062672 filed on Mar. 12, 2008, the entire content of which is incorporated herein by reference.

FIELD OF INVENTION

Apparatuses consistent with the present invention relate to vehicle headlamps.

DESCRIPTION OF RELATED ART

When vehicles are driven at nighttime, headlamps are normally turned on in a so-called "low beam" mode so as to illuminate surfaces of roads, and if necessary, the headlamps are turned on in a so-called "high beam" mode so as to better view regions in front of the vehicles. However, if light emitted from the headlamps is irradiated to an upper area which is located higher than a so-called "cutoff line", then there are some risks that glare may be generated for drivers of preceding vehicles (i.e., vehicles traveling in front of the vehicle and in the same direction as the vehicle) and also pedestrians who are present in areas in front of the vehicles. As a consequence, vehicle headlamps have been proposed by which, for example, positions of persons in front of the vehicle are determined, and then, masks having dimensions and positions corresponding to the determined persons are formed on image forming devices so as to form shadows projected around the persons (see, e.g., JP 2004-231178 A).

Also, for example, vehicle headlamp apparatuses have been proposed by which, for example, a detection is made whether or not a preceding vehicle is present; light of the vehicle headlamps is controlled in response to a detection result such that the light directed to one direction is reduced; and accordingly, the reduced light is irradiated to the other direction (see, e.g., JP 4-081337 A). Further, vehicle-purpose night vision systems have been proposed (see, e.g., JP 2006-188224 A). That is, in the vehicle-purpose night vision systems, for example, an object is detected, and then light of at least one pixel among a plurality of pixels within an optical attenuation matrix is attenuated in response to the detected result.

When a portion of irradiation light irradiated from the headlight is reduced in response to the existence of preceding vehicles and pedestrians, glare can be suppressed which are given to vehicle drivers of the preceding vehicles and the pedestrians who are located within areas where the headlights are dimmed. However, on the other hand, the vehicle drivers may see that this dimmed portion becomes dark. As a result, in such a case that, for example, a pavement marker, a delineator, and the like are located within the area where the headlights are dimmed, and also, in such a case that a pedestrian who tries to cross a road is present in the area where the headlights are dimmed, the drive of the vehicle may not be able to adequately see the pavement marker, delineator, or pedestrian, creating a dangerous situation.

SUMMARY OF INVENTION

Exemplary embodiments of the present invention address the above disadvantages and other disadvantages not described above. However, the present invention is not required to overcome the disadvantages described above, and thus, an exemplary embodiment of the present invention may not overcome any of the problems described above.

Illustrative aspects of the present invention provide a vehicle headlamp apparatus capable of suppressing glare given to a preceding vehicle and/or a pedestrian, while the vehicle headlamp apparatus is capable of suppressing an occurrence of such a forward region which can cause difficulty for a vehicle driver of the vehicle.

According to an illustrative aspect of the present invention, a vehicle headlamp apparatus is provided. The vehicle headlamp apparatus includes a low beam lamp unit which forms a low beam distribution pattern, a first additional lamp unit which forms a first additional light distributing pattern at least partially above a cutoff line of the low beam distributing pattern, a second additional lamp unit which forms a second additional light distributing pattern overlapping with the first additional light distributing pattern, and a controller. The first additional light distributing pattern includes at least one first partial region, and the first additional lamp unit is configured such that a luminous intensity of a light to be irradiated toward the first partial region is adjustable. The second additional light distributing pattern includes at least one second partial region which partially overlaps with the first partial region, and the second additional lamp unit is configured such that a luminous intensity of a light to be irradiated toward the second partial region is adjustable. The controller controls the first additional lamp unit to adjust the luminous intensity of the light to be irradiated toward the first partial region and controls the second additional lamp unit to adjust the luminous intensity of the light to be irradiated toward the second partial region.

Therefore, for example, even in a case in which a preceding vehicle is detected in such a portion that the first partial region is overlapped with the second partial region, a luminous intensity of irradiation light irradiated to both the first and second partial regions is decreased, and reductions of luminous intensity as to the portions other than the overlapped portion can be suppressed. As a consequence, an occurrence of a forward area of the vehicle which creates difficulty for the driver of the vehicle can be suppressed.

BRIEF DESCRIPTION OF THE DRAWINGS

FIG. 9 is a diagram illustrating a relationship of various positions of an oncoming vehicle with respect to the right additional light distributing pattern PAR, the left additional light distributing pattern PAL, and the additional light distributing pattern PA when an intermediate beam mode is selected;

FIG. 10 is a diagram illustrating a relationship between the additional light distributing pattern PA and the respective positions of the oncoming vehicle when the intermediate beam mode is selected in a comparative configuration in which each of the right additional light distributing pattern PAR and the left additional light distributing pattern PAL is divided into the same shapes, such that right partial regions and left partial regions share the same partial regions PA11 to PA15;

DETAILED DESCRIPTION OF EXEMPLARY EMBODIMENTS OF INVENTION

Hereinafter, exemplary embodiments of the invention will be explained with reference to the drawings. The following exemplary embodiments are examples only and do not limit the scope of the invention.

First Exemplary Embodiment

Figure 1:
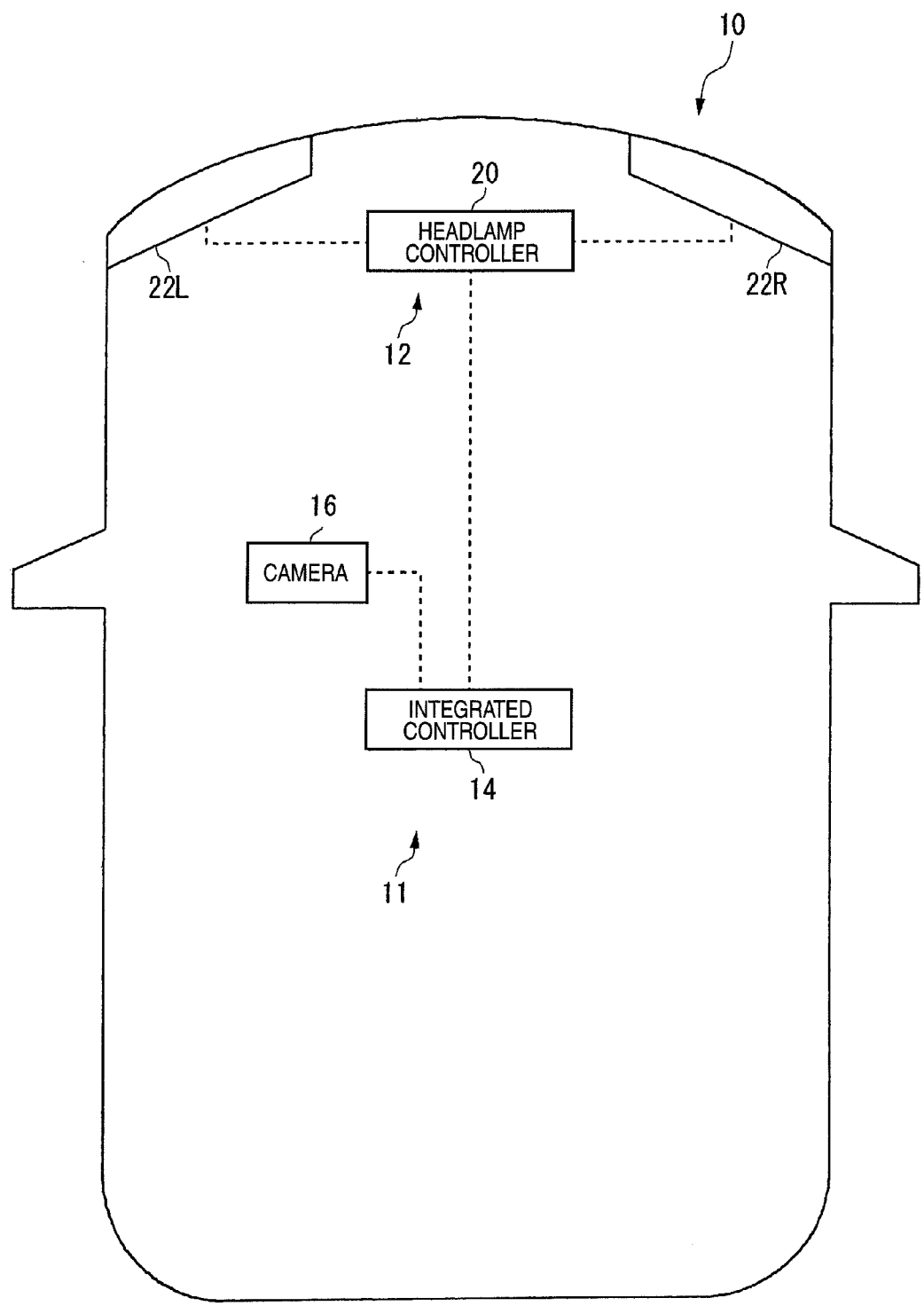
FIG. 1 is a schematic diagram of a vehicle on which a headlamp apparatus according to an exemplary embodiment of the present invention is mounted.

FIG. 1 is a schematic diagram of a vehicle 10 on which a headlamp apparatus 11 according to an exemplary embodiment of the present invention is mounted. The headlamp apparatus 11 includes a headlamp section 12, an integrated controller 14, and a camera 16 (a vehicle position detector).

The integrated controller 14 includes a central processing unit (CPU) for executing various calculating process operations, a read only memory (ROM) in which various control programs are stored in advance, a random access memory (RAM) which is utilized in order to store data and also used as a work area for executing relevant programs, and the like. The integrated controller 14 executes various control operations within the vehicle 10. The camera 16 includes an imaging element, for example, a charge coupled device (CCD) sensor, a complementary metal oxide semiconductor (CMOS) sensor. The camera 16 captures an image of a forward region of the vehicle to produce image data. The camera 16 is coupled to the integrated controller 14 to output the image data to the integrated controller 14.

The headlamp section 12 includes a headlamp controller 20, a right headlamp 22R, and a left headlamp 22L. Both the right headlamp 22R and the left headlamp 22L will be referred to as "headlamp 22" hereinafter as a general term where appropriate. The headlamp controller 20 includes a CPU, a ROM, and a RAM. The headlamp controller 20 controls light to be irradiated from the headlamp 22.

Figure 2:
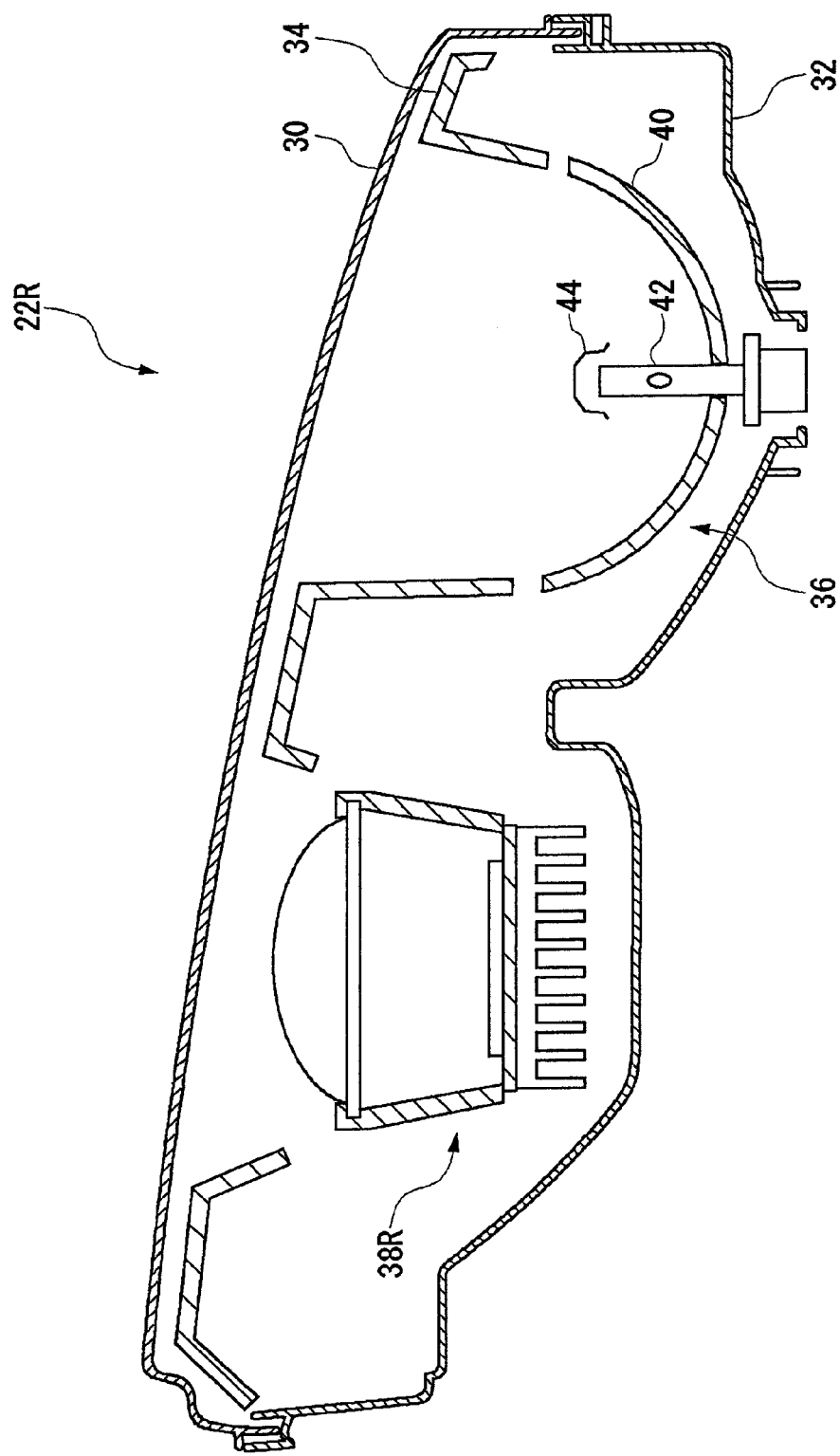
FIG. 2 is a horizontal sectional view of a right headlamp according to a first exemplary embodiment of the present invention.

FIG. 2 is a sectional view of the right headlamp 22R according to the first exemplary embodiment, taken along a horizontal plane and viewed from above. It should be understood that while the left headlamp 22L is constructed in a right-left symmetrical manner with respect to the right headlamp 22R, the right headlamp 22R will be explained in the below-mentioned explanations and a separate explanation of the left headlamp 22L will be omitted for brevity.

The right headlamp 22R includes a transparent cover 30, a lamp body 32, an extension 34, a first lamp unit 36, and a second lamp unit 38R. The lamp body 32 is formed from a resin or the like in a cup shape having an elongate opening portion. The transparent cover 30 may be formed from a transparent resin. The transparent cover 30 is mounted on the lamp body 32 such that the light transition cover 30 may block the opening portion of the lamp body 32. Accordingly, a lamp chamber is formed by the lamp body 32 and the first transmission cover 30, and the extension 34, the first lamp unit 36 and the second lamp unit 38R are arranged in the lamp chamber.

The extension 34 has an opening portion through which light irradiated from the first lamp unit 36 and the second lamp unit 38R passes. The extension 34 is fixed to the lamp body 32. The first lamp unit 36 is arranged on the outer side than the second right lamp unit 38R in the widthwise direction of the vehicle. The first lamp unit 36 is a projector-type lamp unit which forms a low beam distributing pattern.

The first lamp unit 36 has a reflector 40, a light source bulb 42, and a shade 44. The reflector 40 is formed in a cup shape having a through hole in the center. In the first exemplary embodiment, the light source bulb 42 is an incandescent lamp, e.g., a halogen lamp, having a filament arranged therein. Alternatively, the light source bulb 42 may be a discharge lamp such as a metal halide bulb. The light source bulb 42 is inserted into the through hole of the reflector 40 such that the light source bulb 42 protrudes into an inner region of the reflector 40, and is fixed to the reflector 40. The reflector 40 has a curved inner surface to reflect the light emitted from the light source bulb 42 toward a forward region of the vehicle. The shade 44 shields a part of the light that is directly and forwardly emanated from the light source bulb 42.

Figure 3:
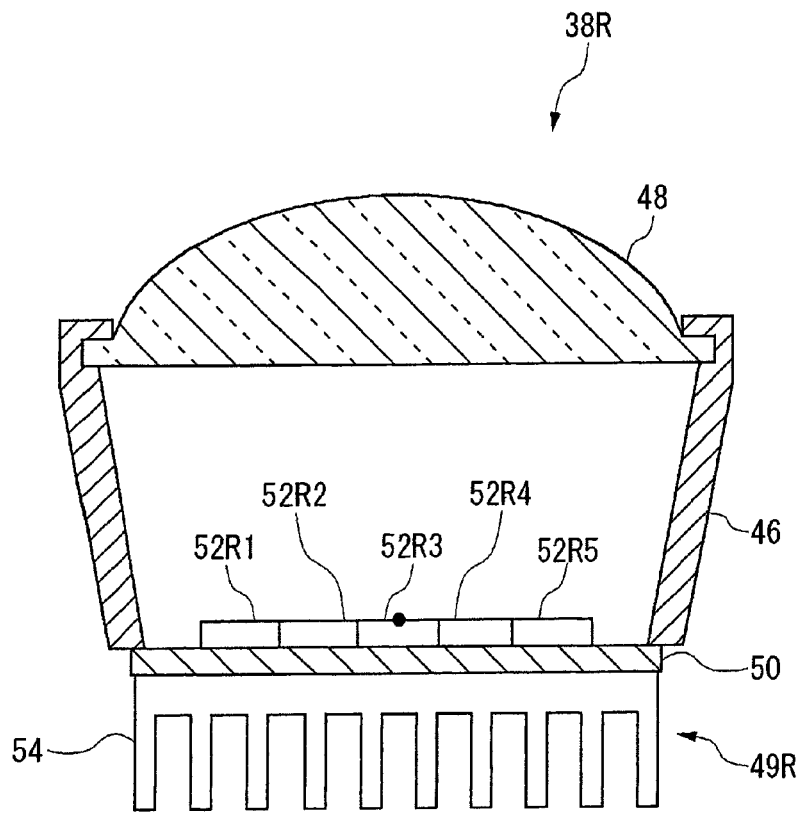
FIG. 3 is a horizontal sectional view of a second right lamp unit of the right headlamp of FIG. 2.

FIG. 3 is a sectional view of the second right lamp unit 38R, taken along a horizontal plane and viewed from above. The second right lamp unit 38R includes a holder 46, a projection lens 48, and a right light emitting unit 49R.

The projection lens 48 is a plano-convex aspheric lens having a convex front surface and a flat rear surface. The projection lens 48 projects a light source image formed on a rear focal plane of the aspheric lens on a virtual vertical screen in a front of the lamp as an inverted image. The projection lens 48 is mounted on one opening portion of the holder 46 formed in the cylindrical shape. The right light emitting unit 49R includes a board 50, a first right light emitting device 52R1, a second right light emitting device 52R2, a third right light emitting device 52R3, a fourth right light emitting device 52R4, a fifth right light emitting device 52R5, and a heat sink

54. The configuration of the right light emitting unit 49R will now be described in detail in relation to FIG. 4.

Figure 4:
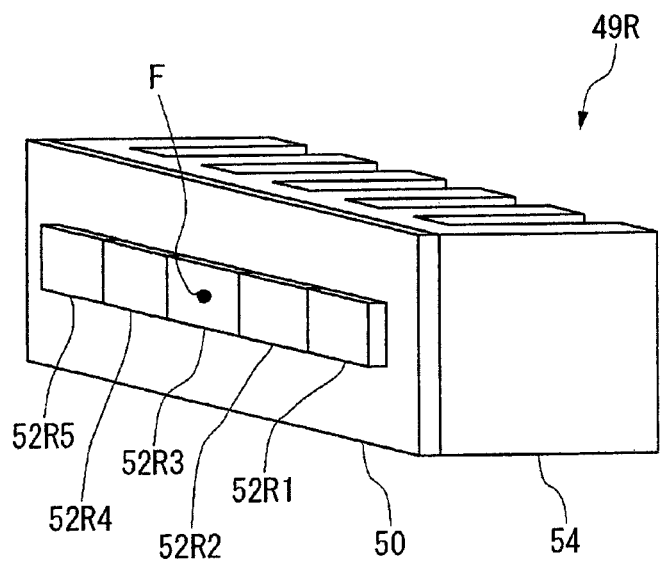
FIG. 4 is a perspective view of a right light emitting unit of the second right lamp unit of FIG. 3.

FIG. 4 is a perspective view of the right light emitting unit 49R. The first right light emitting device 52R1 to fifth right light emitting device 52R5 are formed in rectangular shapes having the same heights with each other, and are arranged in a straight line form on the front surface of the board 50 such that these right light emitting devices 52R1 to 52R5 form a band shape in this order from the first right light emitting device 52R1 to the fifth right light emitting device 52R5. In the first exemplary embodiment, the first right light emitting device 52R1 to the fifth right light emitting device 52R5 have the same widths with each other.

Each of the first right light emitting device 52R1 to the fifth right light emitting device 52R2 has a light emitting chip (not shown) and a thin film. The light emitting chip is a white light emitting diode having a square light emitting face of about 1 mm by 1 mm. It should also be noted that the light emitting chip is not limited to the white light emitting diode, and may be any other type of surface light emitting element, e.g., a laser diode, which emits light in a substantially point-shape. The thin film is provided such that the thin film covers the light emitting face of the light emitting chip. A rear focal point F of the projection lens 48 is positioned at a surface center position of the third right light emitting device 52R3. The heat sink 54 is made to have such a shape that a number of fins are made of a metal such as aluminum, and is mounted on the rear surface of the board 50.

Returning back to FIG. 3, in the right light emitting unit 49R, the board 50 is mounted on the other opening portion of the holder 46 in order that the first right light emitting device 52R1 to the fifth right light emitting device 52R5 are arranged within the holder 46 in this order from the first right light emitting device 52R1 to the fifth right light emitting device 52R5 from the left side. Since the respective right light emitting devices from the first right light emitting device 52R1 to the fifth right light emitting device 52R5 emit light, images of the respective right light emitting devices are projected on the virtual vertical screen of the forward area of the lamp.

Figure 5:
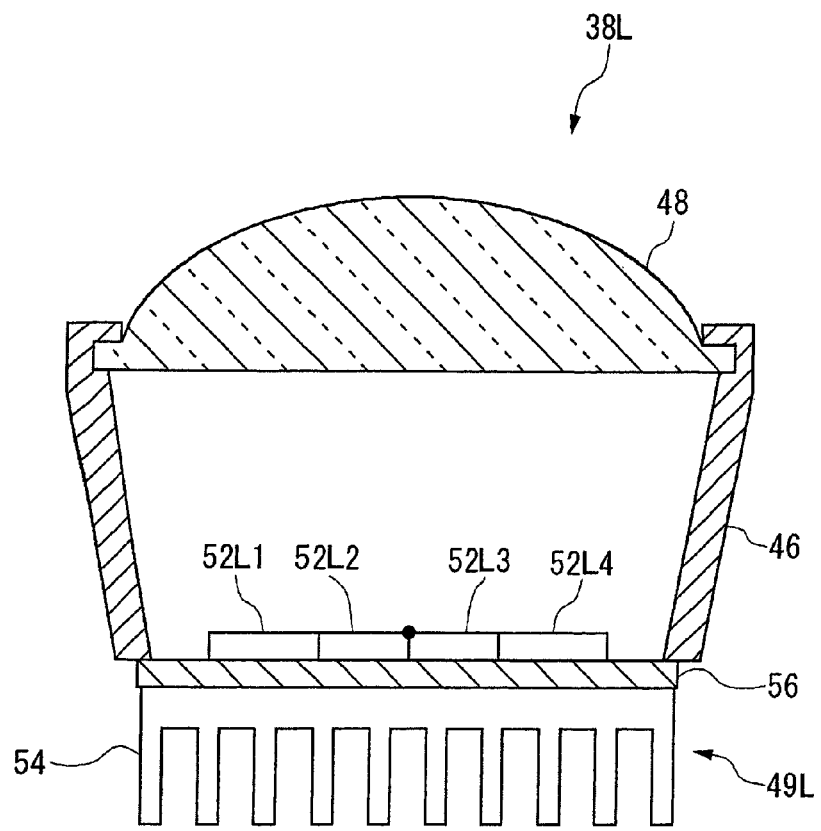
FIG. 5 is a horizontal sectional view of a second left lamp unit according to the first exemplary embodiment of the present invention.

FIG. 5 is a sectional view of a second left lamp unit 38L of the left headlamp 22L, taken along a horizontal plane and viewed from above. It should also be understood that the same reference numerals will be employed as those for denoting structural elements of the second left lamp unit 38L, which are similar to those of the second right lamp unit 38R, and descriptions thereof will be omitted. The second left lamp unit 38L includes a holder 46, a projection lens 48, and a left light emitting unit 49L. The left light emitting unit 49L includes a board 56, a first left light emitting device 52L1, a second left light emitting device 52L2, a third left light emitting device 52L3, a fourth left light emitting device 52L4, and a heat sink 54. The configuration of the left light emitting unit 49L will now be described in detail in relation to FIG. 6.

Figure 6:
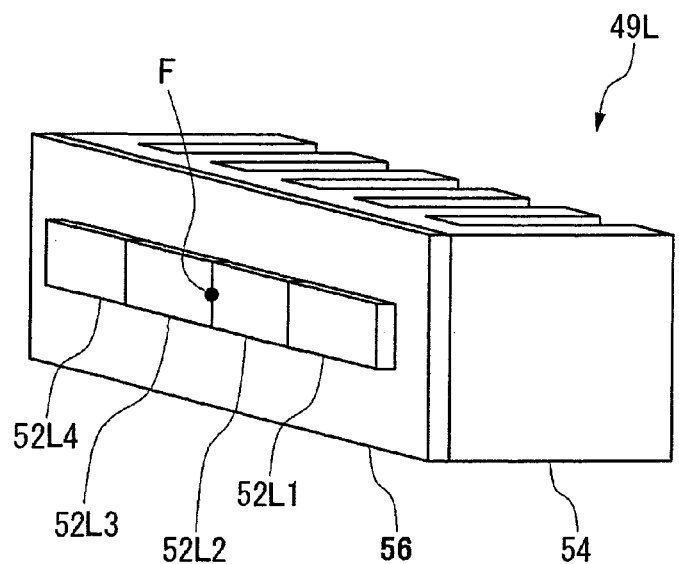
FIG. 6 is a perspective view of a left light emitting unit of the second left lamp unit of FIG. 5.

FIG. 6 is a perspective view of the left light emitting unit 49L. The first left light emitting device 52L1 to fourth left light emitting device 52L4 are formed in rectangular shapes having the same heights with each other. The first left light emitting device 52L1 to the fourth left light emitting device 52L4 are arranged in a straight line form on the front surface of the board 56 such that the first to fourth left light emitting devices 52L1 to 52L4 form a band shape in this order from the first left light emitting device 52L1 to the fourth left light emitting device 52L4. In the first exemplary embodiment, the second left light emitting device 52L2 and the third left light emitting device 52L3 have the same widths with each other. Also, the first left light emitting device 52L1 and the fourth left light emitting device 52L4 have the same widths with each other, the widths of which are wider than the widths of the second left light emitting device 52L2 and the third left light emitting device 52L3. Similar to the above-described structural point of the right light emitting unit 49R, each of the first left light emitting device 52L1 to the fourth left light emitting device 52L4 has both a light emitting chip (not shown) and a thin film. A rear focal point F of the projection lens 48 is positioned at a center of a boundary line between the second left light emitting device 52L2 and the third left light emitting device 52L3. The heat sink 54 is mounted on the rear surface of the board 56.

Returning back to FIG. 5, in the left light emitting unit 49L, the board 56 is mounted on the other opening portion of the holder 46 in order that the first left light emitting device 52L1 to the fourth left light emitting device 52L4 are arranged within the holder 46 in this order from the first left light emitting device 52L1 to the fourth left light emitting device 52L4 from the left side. Since the respective left light emitting devices from the first left light emitting device 52L1 to the fourth left light emitting device 52L4 emit light, images of the respective left light emitting devices are projected on the virtual vertical screen in front of the lamp. It should also be noted that the first right light emitting device 52R1 to the fifth right light emitting device 52R5, and the first left light emitting device 52L1 to the fourth left light emitting device 52L4 will be referred to as "light emitting device 52" as a general term where appropriate.

Figure 7:
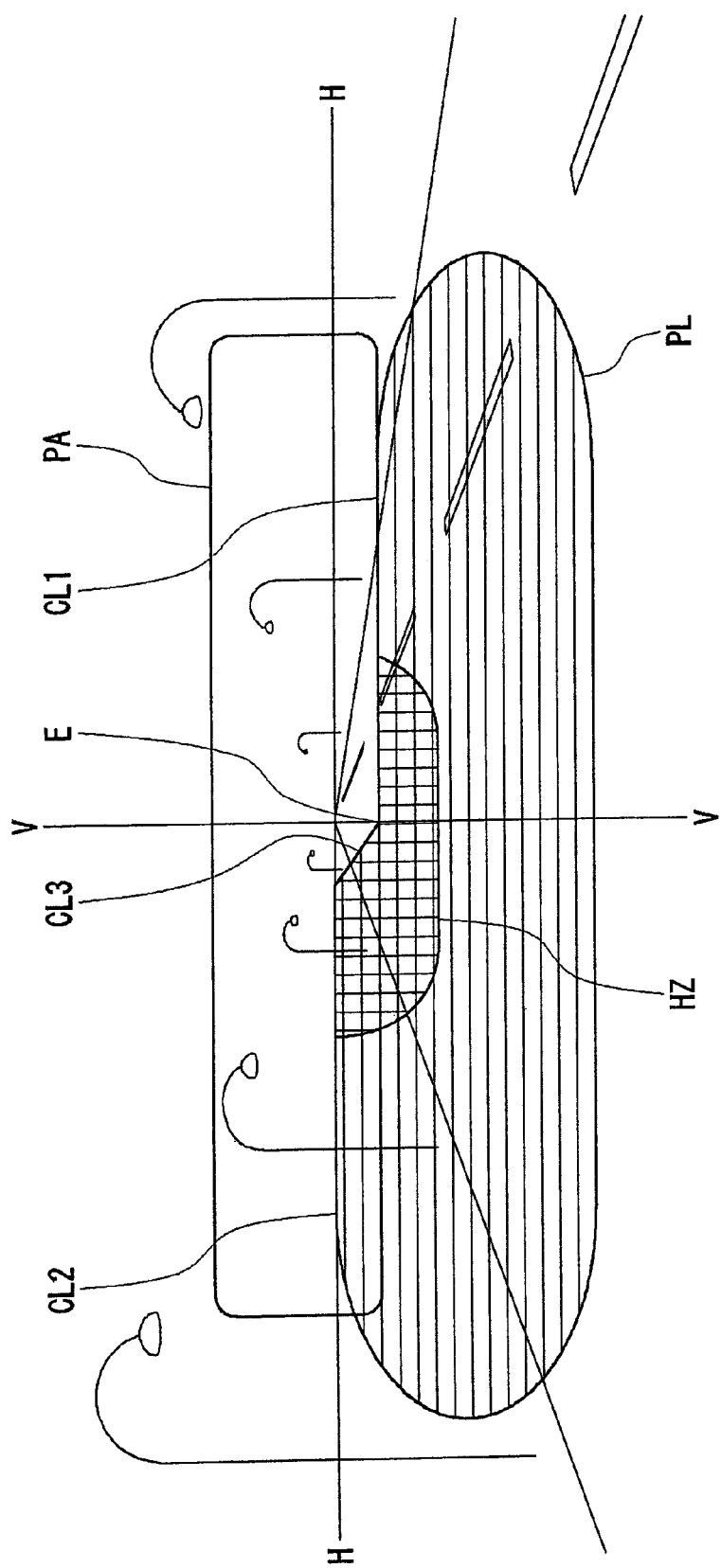
FIG. 7 is a diagram illustrating a light distributing pattern formed on a virtual vertical screen located in front of the vehicle by forwardly irradiating light from right and left headlamps.

FIG. 7 is a diagram illustrating a light distributing pattern to be formed on a virtual vertical screen arranged, e.g., at a position 25 *m* in front of the vehicle 10 by forwardly irradiating light from the right headlamp 22R and the left headlamp 22L.

A low beam distributing pattern PL is formed by the first lamp unit 36. The low beam distributing pattern PL corresponds to a low beam distributing pattern of a left light distribution, and an upper edge thereof has a first cutoff line CL1, a second cutoff line CL2, and a third cutoff line CL3. The first cutoff line CL1 to the third cutoff line CL3 extend along the horizontal direction and create a step across the line V-V. The line V-V is a vertical line which passes through the vanishing point H-V in the forward direction from the lamp. The first cutoff line CL1 is extended along the horizontal direction, which is located on the right side from the line V-V and lower than the line H-H. As a consequence, the first cutoff line CL1 is utilized as a cutoff line for an oncoming vehicle lane. The third cutoff line CL3 is obliquely extended at an inclination angle of about 15 degrees from a left end portion of the first cutoff line CL1 toward an upper left direction. The second cutoff line CL2 is extended over the line H-H on the left side from a cross point between the line H-H and third cutoff line CL3. As a result, the second cutoff line CL2 is utilized as a cutoff line for the vehicle lane. In the low beam distributing pattern PL, while an elbow point E corresponding to a cross point between the first cutoff line CL1 and the line V-V is positioned below the vanishing point H-V by an angle of about 0.5 degrees to 0.6 degrees, a hot zone HZ corresponding to a high luminous intensity area is formed such that the elbow point E is surrounded along a slightly left direction.

An additional light distributing pattern PA is formed by light irradiated from the second right lamp unit 38R and light irradiated from the second left lamp unit 38L. As a result, each of the second right lamp unit 38R and the second left lamp unit 38L may function as an additional lamp unit which forms the additional light distributing pattern PA. It should also be noted that each of the second right lamp unit 38R and the second left lamp unit 38L may function as a high beam lamp unit. The additional light distributing pattern PA is formed in a band shape which is extended along the horizontal direction and includes the horizontal line such that a lower end of the additional light distributing pattern PA is positioned on the first cutoff line CL1. The additional light distributing pattern PA is formed by combining a right additional light distributing pattern PAR formed by the second right lamp unit 38R with a left additional light distributing pattern PAL formed by the second left lamp unit 38L.

Figure 8A:
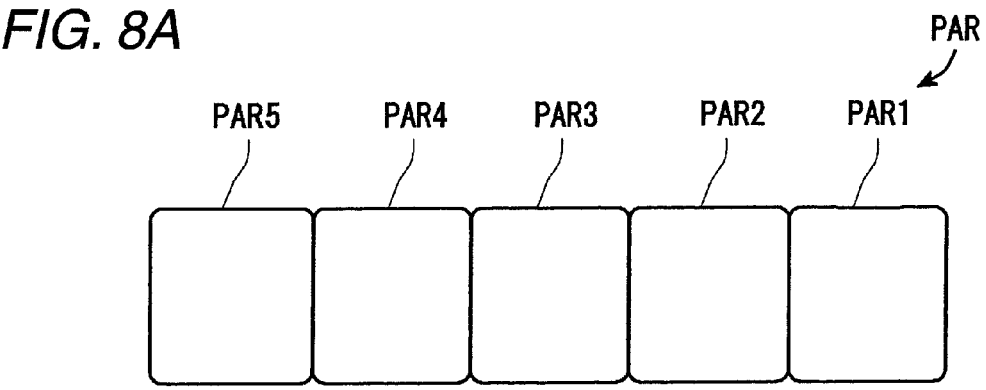
FIG. 8A is a diagram illustrating a right additional light distributing pattern PAR.

FIG. 8A is a diagram illustrating the right additional light distributing pattern PAR. The right additional light distributing pattern PAR has the same outer shape as that of the additional light distributing pattern PA. In the first exemplary embodiment, the right additional light distributing pattern PAR is divided into 5 areas. It should also be understood that these 5 areas will be sequentially referred to as a first right partial region PAR1, a second right partial region PAR2, a third right partial region PAR3, a fourth right partial region PAR4, and a fifth right partial region PAR5 from the right-sided partial region, and will be referred as "right partial region" as a general term where appropriate.

Each of the first right partial region PAR1 to the fifth right partial region PAR5 is formed as a projection image where each of the first right light emitting device 52R1 to the fifth right light emitting device 52R5 is employed as a light source image. As a consequence, the first right partial region PAR1 to the fifth right partial region PAR5 are provided such that luminous intensity of irradiation light irradiated to each of the right partial regions PAR1 to PAR5 can be increased and/or decreased by adjusting the luminous intensity of a corresponding one of the first right light emitting device 52R1 to the fifth right emitting element 52R5.

The first right partial region PAR1 to the fifth right partial region PAR5 are formed as rectangular shapes whose heights and widths are equal to each other respectively. The respective first right partial region PAR1 to fifth right partial region PAR5 are located adjacent to each other on dividing lines which are extended along the vertical direction. It should also be noted that the shapes of the first right partial region PAR1 to the fifth right partial region PAR5 are not limited only to rectangular shapes, but may be made from other shapes, for example, trapezoids or parallelograms.

Figure 8B:
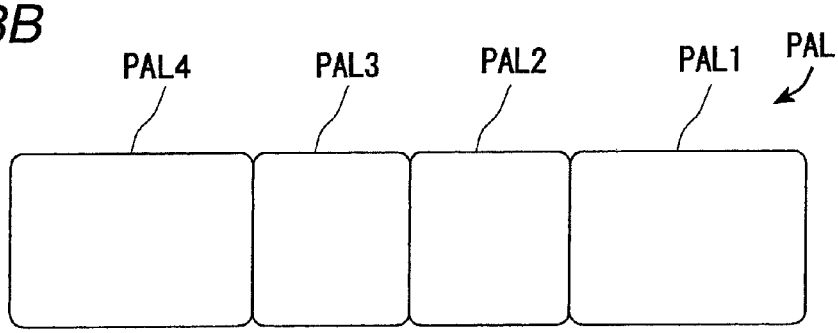
FIG. 8B is a diagram illustrating a left additional light distributing pattern PAL.

FIG. 8B is a diagram illustrating the left additional light distributing pattern PAL. The left additional light distributing pattern PAL has the same outer shape as that of the additional light distributing pattern PA. In the first exemplary embodiment, the left additional light distributing pattern PAL is divided into 4 areas. It should also be understood that these 4 areas will be sequentially referred to as a first left partial region PAL1, a second left partial region PAL2, a third left partial region PAL3, and a fourth left partial region PAL4 from the right-sided partial region, and will be referred as "left partial region" as a general term where appropriate.

Each of the first left partial region PAL1 to the fourth left partial region PAL4 is formed as a projection image where each of the first left light emitting device 52L1 to the fourth left light emitting device 52L4 is employed as a light source image. As a consequence, the first left partial region PAL1 to the fourth left partial region PAL4 are provided such that luminous intensity of irradiation light irradiated to each of the left partial regions PAL1 to PAL4 can be increased and/or decreased by adjusting the luminous intensity of a corresponding one of the first left light emitting device 52L1 to the fourth left light emitting device 52L4.

The first left partial region PAL1 to the fourth left partial region PAL3 are formed as rectangular shapes whose heights and widths are equal to each other respectively. The second left partial region PAL2 and the third left partial region PAL3 have the same widths with each other. The first left partial region PAL1 and the fourth left partial region PAL have the same widths with each other, and also have wider widths than those of the second left partial region PAL2 and the third left partial region PAL3. The respective first left partial region PAL1 to fourth left partial region PAL4 are located adjacent to each other on dividing lines which are extended along the vertical direction. It should also be noted that the shapes of the first left partial region PAL1 to the fourth left partial region PAL4 are not limited only to rectangular shapes, but may be made from other shapes, for example, trapezoids or parallelograms.

Figure 8C:
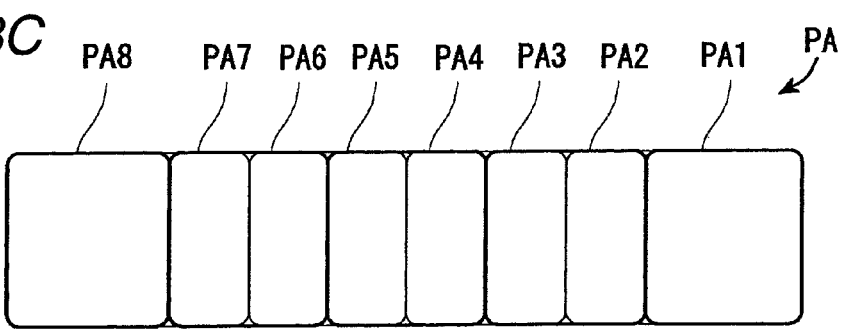
FIG. 8C is a diagram illustrating an additional light distributing pattern PA which is a combination of the right additional light distributing pattern PAR and the left additional light distributing pattern PAL.

FIG. 8C is a diagram illustrating an additional light distributing pattern PA produced by combining the right additional light distributing patterns PAR with the left additional light distributing patterns PAL. For the sake of simplicity of understanding, outer shapes and dividing lines of the right additional light distributing patterns PAR are illustrated by wide lines, whereas outer shapes and dividing lines of the left additional light distributing patters PAL are illustrated by narrow lines.

For example, the second right partial region PAR2 is partially overlapped with the first left partial region PAL1 and the second left partial region PAL2, respectively. Also, the third right partial region PAR3 is partially overlapped with the second left partial region PAL2 and the third left partial region PAL3, respectively. Also, the fourth right partial region PAR4 is partially overlapped with the third left partial region PAL3 and the fourth left partial region PAL4, respectively. As a result, the additional light distributing pattern PA is formed such that the dividing lines of the right additional light distributing patterns PAR and the dividing lines of the left additional light distributing patterns PAL alternately appear in accordance with advances thereof along the horizontal direction. Now, partial regions of the additional light distributing pattern PA, which are segmented by the dividing lines of the right additional light distributing patterns PAR and the dividing lines of the left additional light distributing patterns PAL, will be defined as a first partial region PA1, a second partial region PA2, a third partial region PA3, a fourth partial region PA4, a fifth partial region PA5, a sixth partial region PA6, a seventh partial region PA7, and an eighth partial region PA8 from the right side.

Figure 9:
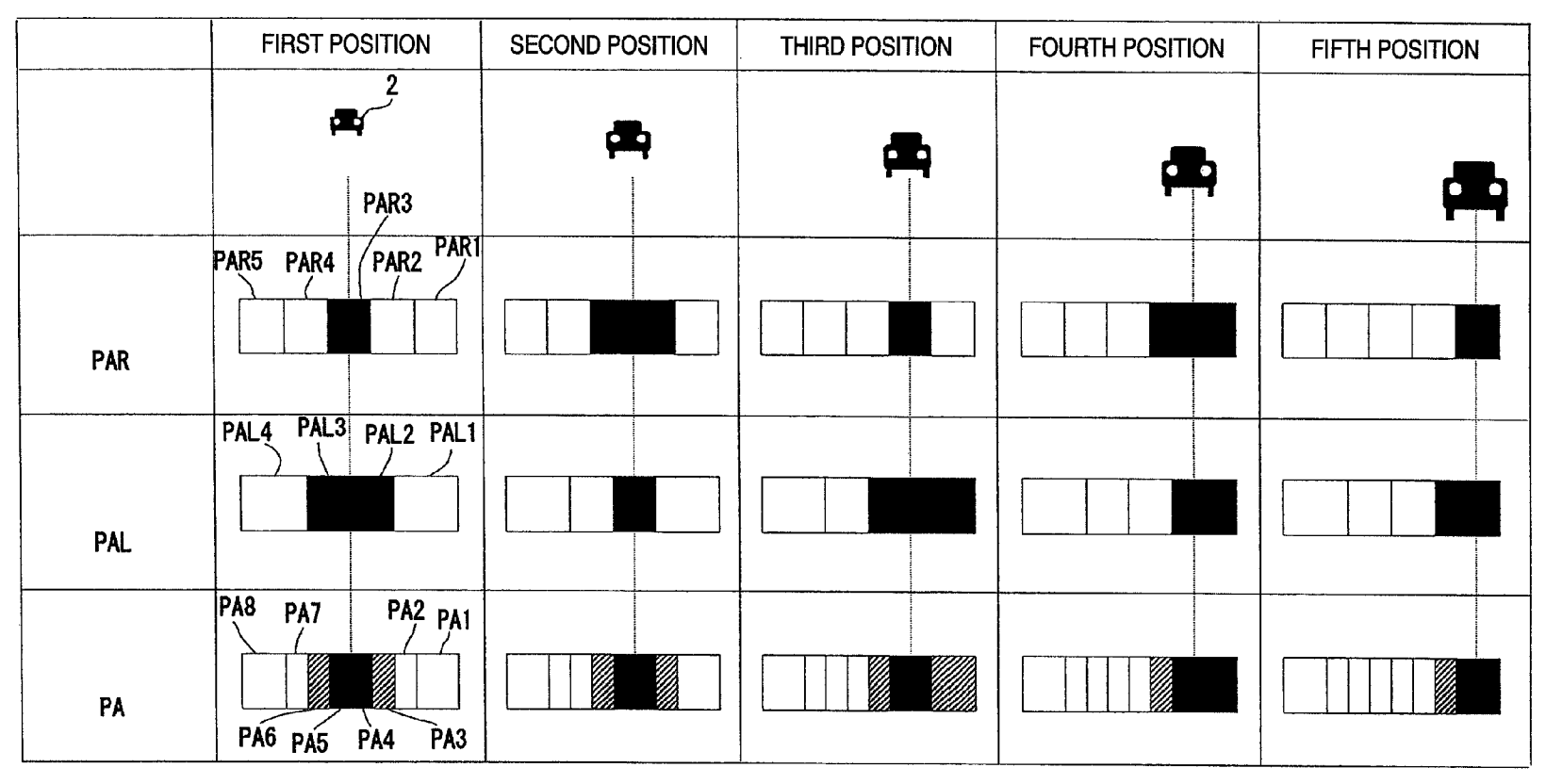

In the vehicle 10 according to the first exemplary embodiment, an intermediate beam mode is provided. With reference to FIG. 9, detailed description will be made of a method for controlling the headlamp 22 when the intermediate beam mode is selected.

FIG. 9 is a diagram illustrating a relationship of various positions of oncoming vehicles with respect to the right additional light distributing patterns PAR, the left additional light distributing patterns PAL and the additional light distributing patterns PA during the intermediate beam mode. An intermediate beam switch (not shown) is provided in the vehicle 10 in addition to the high beam switch (not shown). When the intermediate beam switch is turned on, an intermediate beam ON signal is output to the headlamp controller 10. When the headlamp controller 20 receives the intermediate beam ON signal, light is irradiated in the intermediate beam mode by driving the right headlamp 22R and the left headlamp 22L.

More specifically, the integrated controller 14 determines whether an oncoming vehicle with a headlamp turned on is present by analyzing image data entered from the camera 16. When there is such an oncoming vehicle whose headlamp is turned on, the integrated controller 14 specifies a position of the oncoming vehicle by using the position of the headlamp acquired by analyzing the image data.

The integrated controller 14 outputs positional data to the headlamp controller 20, while the positional data indicates the position of the oncoming vehicle whose headlamp being turned on. The headlamp controller 20 predicts that the oncoming vehicle is located within a right partial region including the position indicated by the positional data, and thus, turns off the light emitting device 52 which forms the above-described right partial region. Instead of turning off the light emitting device 52, the headlamp controller 20 may alternatively decrease luminous intensity of irradiation light of the light emitting device 52 for forming the right partial region in which it is predicted that the oncoming vehicle is present, such that the above-described luminous intensity of the light emitting device 52 becomes lower than a normal luminous intensity of the light emitting device 52 in which it is predicted that a vehicle is not present.

Further, the headlamp controller 20 turns off the light emitting device 52 for forming a left partial region in which it is predicted that a vehicle is present. It should also be noted that instead of turning off the light emitting device 52, the headlamp controller 20 may alternatively decrease the luminous intensity of the irradiation light of the light emitting device 52 for forming the left partial region in which it is predicted that the oncoming vehicle is present, such that the above-described luminous intensity of the light emitting device 52 becomes lower than a normal luminous intensity of the light emitting device 52 in which it is predicted that the vehicle is not present. As previously described, the irradiation of the light to the oncoming vehicle can be suppressed based upon the additional light distributing pattern PA, so that glare can be suppressed for a driver of the oncoming vehicle.

The integrated controller 14 may specify a position of a pedestrian by using photographed image data. Further, the headlamp controller 20 may control turning on of the light emitting device 52 such that the luminous intensity of the irradiation light irradiated to both the right partial region and the left partial region which include the positions of the pedestrians are lower than the normal luminous intensity of the irradiation light.

If the headlamp controller 20 determines that an oncoming vehicle 2 is located at a first position which bridges the dividing line between the second left partial region PAL2 and the third left partial region PAL3, the headlamp controller 20 turns off the third right light emitting device 52R3 for forming the third right partial region PAR3. Also, the headlamp controller 20 turns off both the second left light lighting element 52L2 for forming the second left partial region PAL2, and the third left light lighting element 52L3 for forming the third left partial region PAL3. As a result, as to the additional light distributing pattern PA, the light is not irradiated to the fourth partial region PA4 and the fifth partial region PA5, so that this portion becomes dark. On the other hand, since light is irradiated from one of the second left lamp unit 38L and the second right lamp unit 38R to both the third partial region PA3 and the sixth partial region PA6, these third and sixth partial regions PA3 and PA6 become lighter than both the fourth partial region PA4 and the fifth partial region PA5, and also, become darker than the other partial regions which are predicted as partial regions in which an oncoming vehicle is not present. In FIG. 9, a black area indicates an area to which light is not irradiated from both the second right lamp unit 38R and the second left lamp unit 38L. A hatched area indicates such an area to which light is irradiated from one of the second right lamp unit 38R and the second left lamp unit 38L.

If the headlamp controller 20 determines that the oncoming vehicle 2 is located at a second position which bridges the dividing line between the second right partial region PAR2 and the third right partial region PAR3, the headlamp controller 20 turns off the second left light emitting device 52L2 for forming the second left partial region PAL2, and further, the headlamp controller 20 turns off both the second right light lighting element 52R2 for forming the second left partial region PAR2, and the third right light lighting element 52R3 for forming the third right partial region PAR3. As a result, as to the additional light distributing pattern PA, the light is not irradiated to the third partial region PA3 and the fourth partial region PA4, so that this portion becomes dark. On the other hand, since light is irradiated from one of the second left lamp unit 38L and the second right lamp unit 38R to both the second partial region PA2 and the fifth partial region PA5, these second and fifth partial regions PA2 and PA5 become lighter than both the fourth partial region PA4 and the third partial region PA3, and also, become darker than the other partial regions which are predicted as partial regions in which the oncoming vehicle is not present.

If the headlamp controller 20 determines that the oncoming vehicle 2 is located at a third position which bridges the dividing line between the second left partial region PAL2 and the first left partial region PAL1, the headlamp controller 20 turns off the second right light emitting device 52R2 for forming the second right partial region PAR2. Also, the headlamp controller 20 turns off both the second left light lighting element 52L2 for forming the second left partial region PAL2, and the first left light lighting element 52L1 for forming the first left partial region PAL1. As a result, as to the additional light distributing pattern PA, the light is not irradiated to the second partial region PA2 and the third partial region PA3, so that this portion becomes dark conditions. On the other hand, since light is irradiated from one of the second left lamp unit 38L and the second right lamp unit 38R to both the first partial region PA1 and the fourth partial region PA4, these first and fourth partial regions PA1 and PA4 become lighter than both the second partial region PA2 and the third partial region PA3, and also, become darker than the other partial regions which are predicted as partial regions in which the oncoming vehicle is not present.

If the headlamp controller 20 determines that the oncoming vehicle 2 is located at a fourth position which bridges the dividing line between the first right partial region PAR1 and the second right partial region PAR2, the headlamp controller 20 turns off the first left light emitting device 52L1 for forming the first left partial region PAL1, and also, the headlamp controller 20 turns off both the second right light lighting element 52R2 for forming the second right partial region PAR2, and the first right light lighting element 52R1 for forming the first right partial region PAR1. As a result, as to the additional light distributing pattern PA, the light is not irradiated to the first partial region PA1 and the second partial region PA2, so that this portion becomes dark. On the other hand, although light is not irradiated from the second right lamp unit 38R to the third partial region PA3, since light is irradiated from the second left lamp unit 38L to the third partial region PA3, the third partial region PA3 becomes lighter than both the first partial region PA1 and the second partial region PA2, and also, becomes darker than the other partial regions which are predicted as partial regions in which the oncoming vehicle is not present.

If the headlamp controller 20 determines that the oncoming vehicle 2 is located at a fifth position which is positioned in the vicinity of a center of the first right partial region PAR1 along the horizontal direction, the headlamp controller 20 turns off the first right light emitting device 52R1 for forming the first right partial region PAR1. Also, the headlamp controller 20 turns off the first left light emitting device 52L1 for forming the first left partial region PAL1. As a result, as to the additional light distributing pattern PA, light is not irradiated to the first partial region PA1, so that the partial region PA1 becomes dark. On the other hand, although light is not irradiated from the second left lamp unit 38L to the second partial region PA2, light is irradiated from the second right lamp unit 38R to the second partial region PA2, so that the second partial region PA2 becomes lighter than the first partial region PA1 and also, becomes darker than the other partial regions which are predicted as partial regions in which the oncoming vehicle is not present. When the oncoming vehicle 2 is located to the left direction rather than the first position, the headlamp controller 20 controls turning on of the light emitting device 52 such that right and left positional relationships from the second position to the fifth position are inverted with respect to the right and left directions in response to existing positions of the oncoming vehicle 2.

FIG. 10 is a diagram illustrating a relationship between the additional light distributing patterns PA and the respective positions of the oncoming vehicle when the intermediate beam mode is selected in a comparative configuration in which a right additional light distributing pattern PAR and a left additional light distributing pattern PAL are divided into the same shapes, such that right partial regions and left partial regions share the same partial regions PA11 to PA15. Similar to the case described above, in the case that light emitting devices for forming partial regions where the oncoming vehicle 2 is present in the intermediate beam mode are turned off, as indicated in FIG. 10, for example, when the oncoming vehicle 2 is located at a second position, both the 12th partial region PA12 and the 13th partial region PA13 are brought into dark conditions, which correspond to the second partial region PA2 to the fifth partial region PA5. Also, for example, when the oncoming vehicle 2 is located at a fourth position, both the 12th partial region PA12 and the 11th partial region PA11 are brought into dark conditions, which correspond to the first partial region PA1 to the third partial region PA3.

In contrast, as shown in FIG. 9, in the intermediate beam mode in accordance with the first exemplary embodiment, when the oncoming vehicle 2 is located at the second position, only the third partial region PA3 and the fourth partial region PA4 are brought into the dark conditions. Also, when the oncoming vehicle 2 is located at the fourth position, only the first partial region PA1 and the second partial region PA2 are brought into the dark conditions. As a consequence, an area in which the vehicle driver has difficulty in viewing can be reduced, as compared with such a case shown in FIG. 10, so that the vehicle driver can view a wider range including, for example, pavement markers and delineators.

Second Exemplary Embodiment

Figure 11:
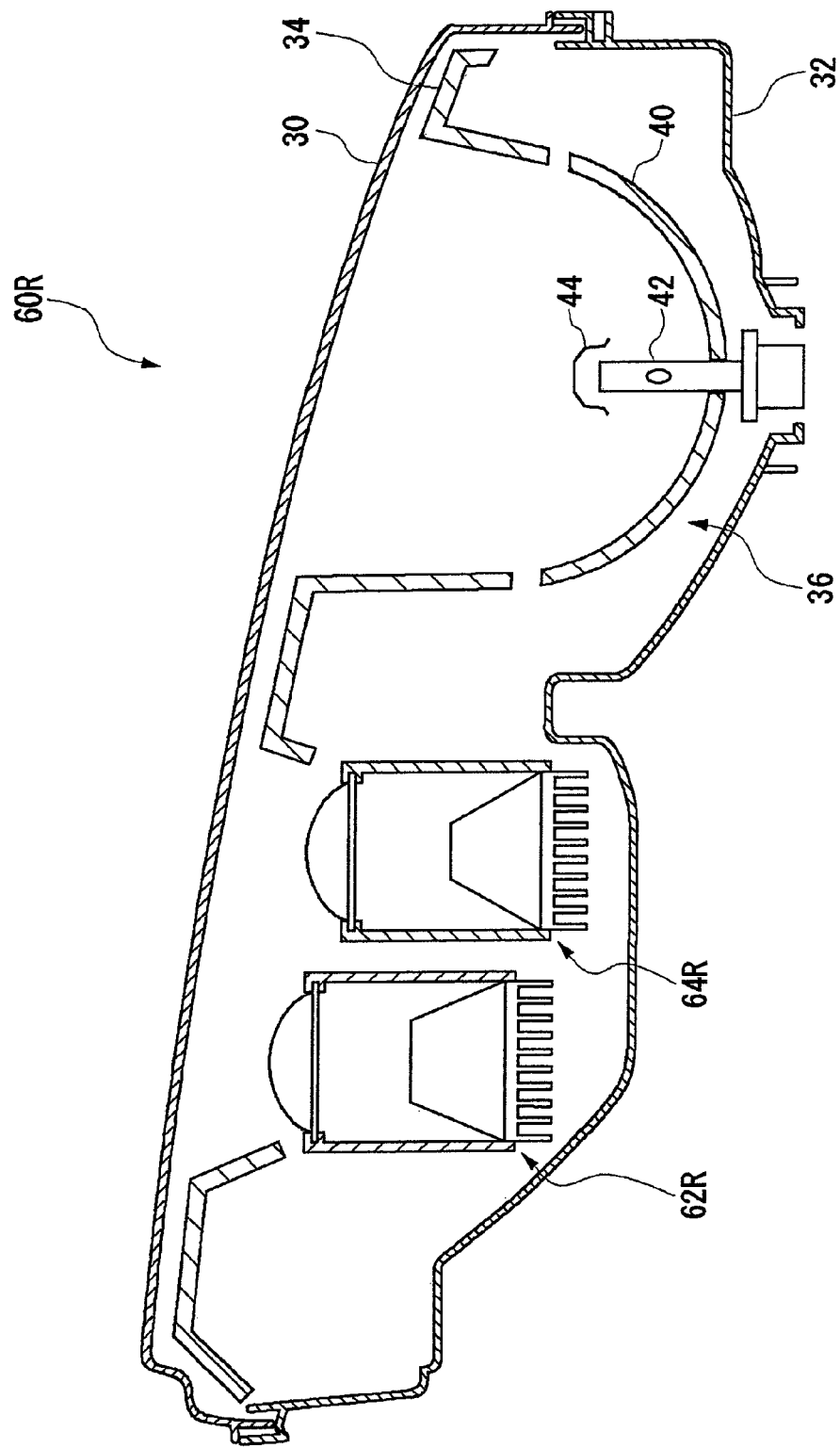
FIG. 11 is a horizontal sectional view of a right headlamp according to a second exemplary embodiment of the present invention.

FIG. 11 is a sectional view of a right headlamp 60R according to a second exemplary embodiment of the present invention, taken along a horizontal plane and viewed from above. It should be noted that a configuration of a vehicle according to the second exemplary embodiment is similar to the configuration of the vehicle 10 according to the first exemplary embodiment except that the right headlamp 60R and a left headlamp 60L are provided instead of the right headlamp 22R and the left headlamp 22L. It should also be noted that the same reference numerals will be used to denote structural elements of the vehicle of the second exemplary embodiment that are similar to those of the vehicle 10 according to the first exemplary embodiment. The left headlamp 60L is constructed in a right-left symmetrical manner with respect to the right headlamp 60R. Therefore, the right headlamp 60R will be explained in detail below and a detailed explanation of the left headlamp 60L will be omitted.

The right headlamp 60R is configured in a similar manner to the right headlamp 22R according to the first exemplary embodiment except that instead of the second right lamp unit 38R, a second right lamp unit 62R and a third right lamp unit 64R are provided.

Figure 12:
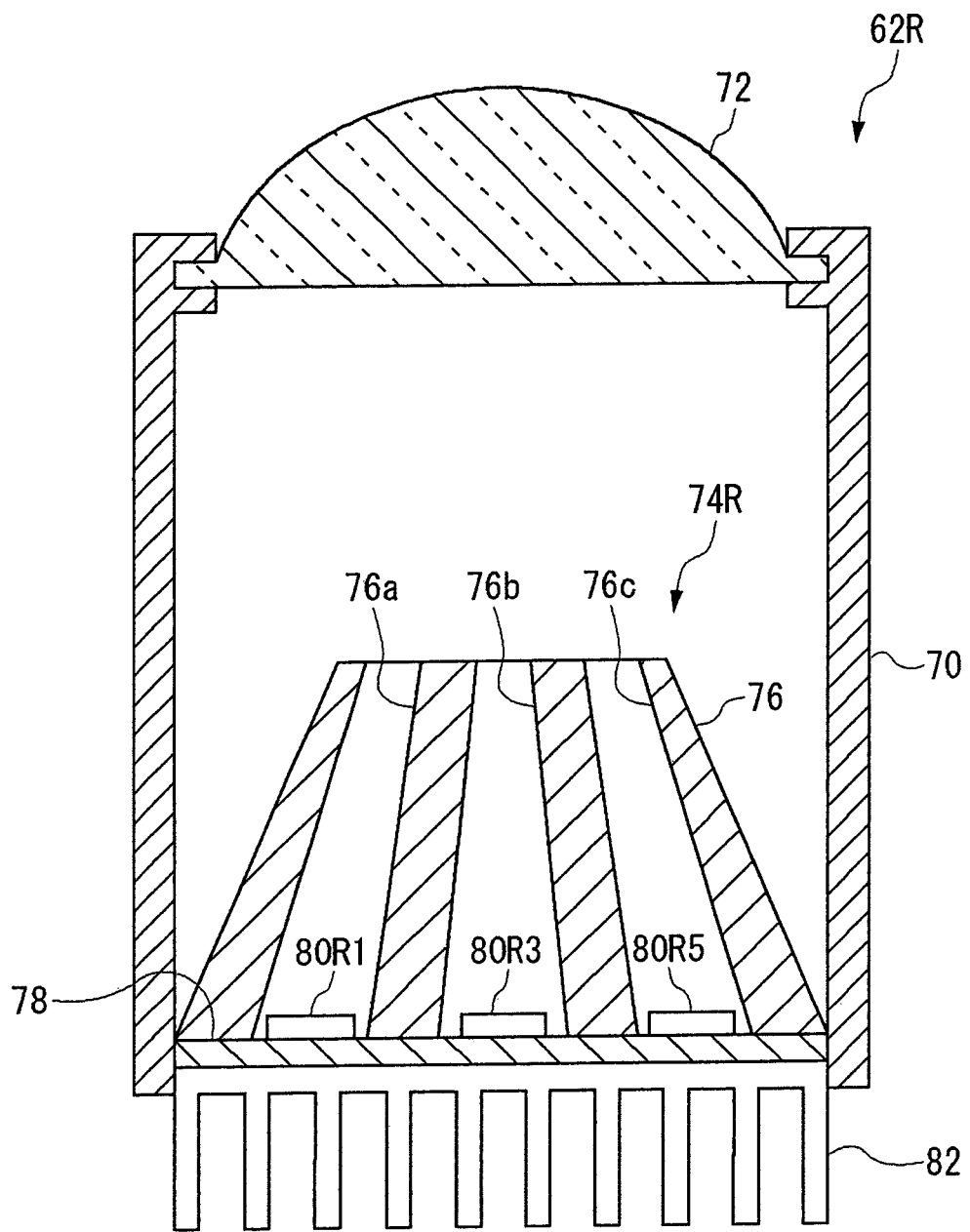
FIG. 12 is a horizontal sectional view of a second right lamp unit of the right headlamp of FIG. 11.

FIG. 12 is a sectional view of the second right lamp unit 62R, taken along a horizontal plane and viewed from above. The second right lamp unit 62R includes a holder 70, a projection lens 72, and a right light emitting unit 74R. The projection lens 72 is a plano-convex aspheric lens. The projection lens 72 is mounted on one opening portion of the holder 70 formed in a cylindrical shape.

The right light emitting unit 74R includes a block 76, a board 78, a first right light emitting device 80R1, a third right light emitting device 80R3, a fifth right light emitting device 80R5, and a heat sink 82. A first optical path 76a, a second optical path 76b, and a third optical path 76c, which correspond to through holes, are formed in the block 76. An inner plane of each of the first optical path 76a to the third optical path 76c is constructed of a mirror plane. One edge plane of the block 76, in which opening portions of the through holes are formed, is fixed to a front surface of the board 78. The first right light emitting device 80R1, the third right light emitting device 80R3, and the fifth right light emitting device 80R5 are arranged at respective positions corresponding to the respective opening portions of the first optical path 76a, the second optical path 76b, and the third optical path 76c on a front surface of the board 78. Each of the light emitting devices 80R1, 80R3, 80R5 has a light emitting chip (not shown) which is a white light emitting diode having a square light emitting face of about 1 mm by 1 mm. The heat sink 82 is made to have such a shape such that a number of fins are made of a metal such as aluminum, and is mounted on the rear surface of the board 78.

Figure 13:
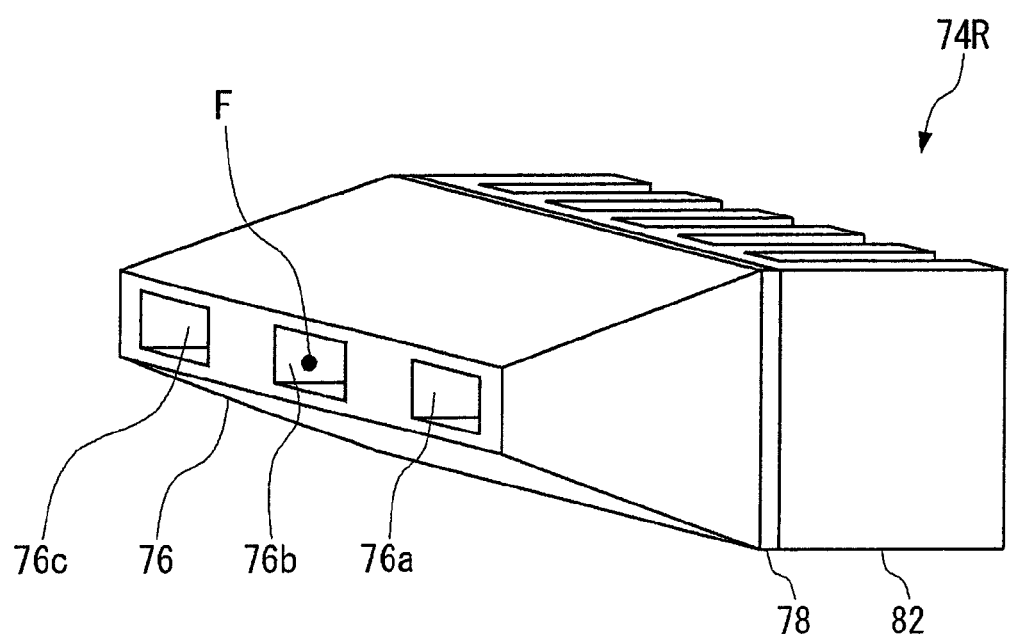
FIG. 13 is a perspective view of a right light emitting unit of the second right lamp unit of FIG. 12.

FIG. 13 is a perspective view of the right light emitting unit 74R. As shown in FIG. 13, the first optical path 76a to the third optical path 76c are arranged such that the respective opening portions thereof are arranged in a row along a lateral direction. The respective opening portions of the first optical path 76a to the third optical path 76c are formed in rectangular shapes whose heights and whose widths are equal to each other, respectively. A rear focal point F of the projection lens 72 is positioned at a center of the opening portion of the second optical path 76b.

Returning back to FIG. 12, in the right light emitting unit 74R, the board 78 is mounted on the other opening portion of the holder 70 in order that the block 76 may be arranged within the holder 70, so that the board 78 is fixed. The right light emitting device 74R is fixed such that the first right light emitting device 80R1, the third right light emitting device 80R3, and the fifth right light emitting device 80R5 are arranged in this order from the left side.

When the first right light emitting device 80R1 is turned on, the irradiation light thereof is reflected on the inner plane of the first optical path 76a, travels to the opening portion thereof, and then, the irradiation light causes a first right partial region PAR1 to be formed as a projection image of such an image of the opening portion. When the third right light emitting device 80R3 is turned on, the irradiation light thereof is reflected on the inner plane of the second optical path 76b, travels to the opening portion thereof, and then, the irradiation light causes a third right partial region PAR3 to be formed as a projection image of such an image of the opening portion. When the fifth right light emitting device 80R5 is turned on, the irradiation light thereof is reflected on the inner plane of the third optical path 76c, travels to the opening portion thereof, and then, the irradiation light causes a fifth right partial region PAR5 to be formed as a projection image of such an image of the opening portion.

Figure 14:
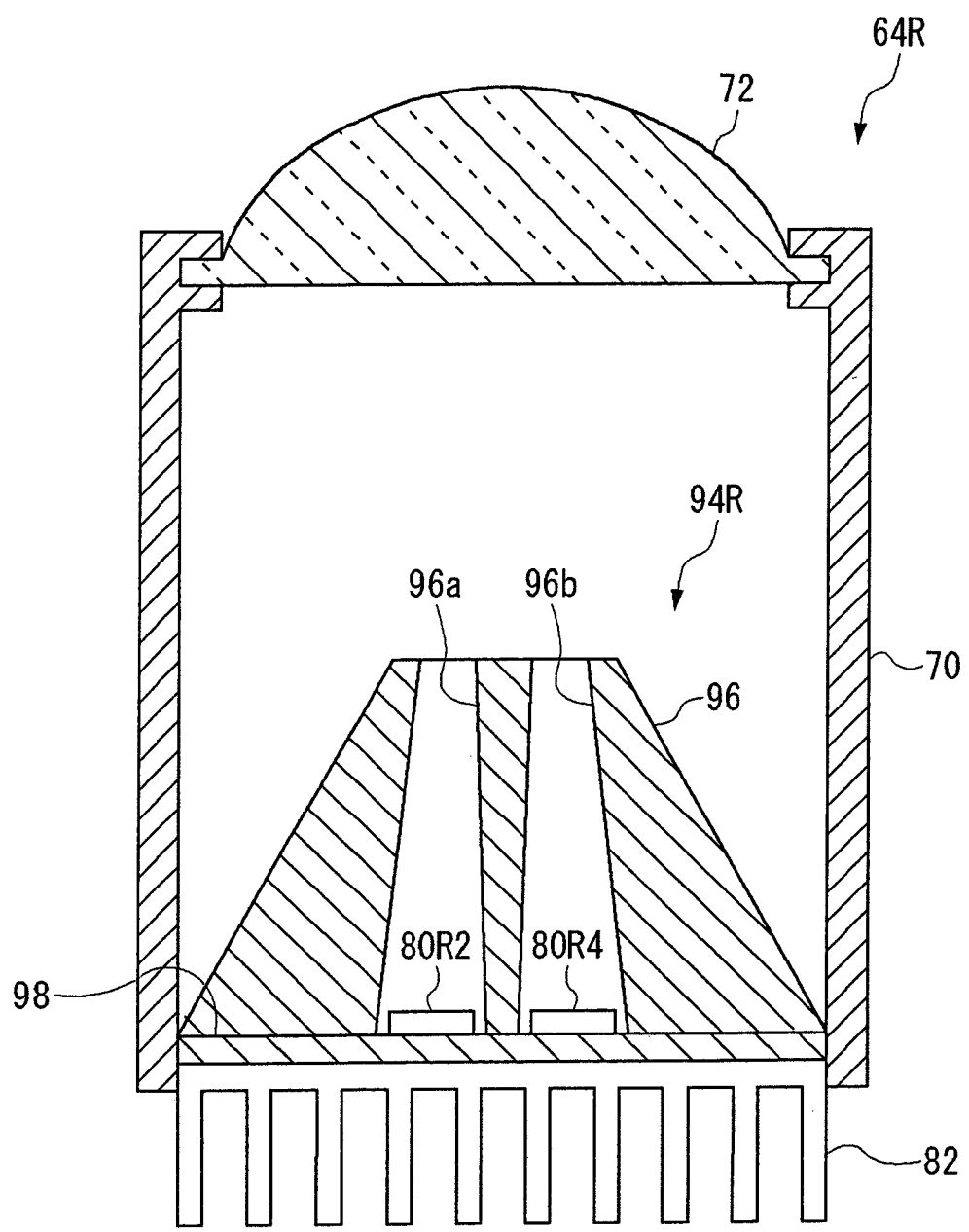
FIG. 14 is a horizontal sectional view of a third right lamp unit of the right headlamp of FIG. 11.

FIG. 14 is a sectional view of the third right lamp unit 64R, taken along a horizontal plane and viewed from above. It should also be understood that the same reference numerals will be used as those for denoting structural elements of the third right lamp unit 64R, which are similar to those of the above-described exemplification, and descriptions thereof will be omitted. The third right lamp unit 64R includes the holder 70, the projection lens 72, and a right light emitting unit 94R.

The right light emitting unit 94R includes a block 96, a board 98, a second right light emitting device 80R2, a fourth right light emitting device 80R4, and the heat sink 82. A first optical path 96a and a second optical path 96b are formed in the block 96, while the first and second optical paths 96a, 96b correspond to through holes. The respective inner planes of the first optical path 96a and the second optical path 96b are constructed by mirror planes. One edge plane of the block 96, where the opening portions of these through holes are formed, is fixed to a front surface of the board 98. On the front plane of the board 98, the second right light emitting device 80R2 is arranged at a position corresponding to the opening portion of the first optical path 96a, and the fourth right light emitting device 80R4 is arranged at a position corresponding to the opening portion of the second optical path 96b. Each of the right light emitting devices 80R2, 80R4 includes a light emitting chip (not shown) such as a white light emitting diode having a square light emitting face of about 1 mm by 1 mm.

Figure 15:
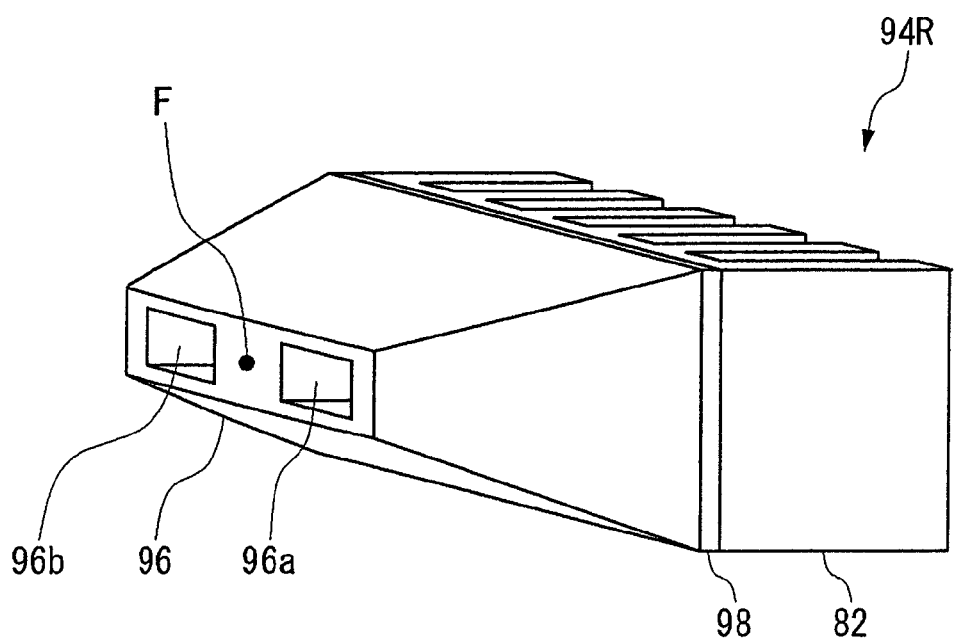
FIG. 15 is a perspective view of a right light emitting unit of the third right lamp unit of FIG. 14.

FIG. 15 is a perspective view of the right light emitting unit 94R. As shown in FIG. 15, a first optical path 96a and a second optical path 96b are arranged such that the respective opening portions thereof are arranged in a row along a lateral direction. The respective opening portions of the first optical path 96a and the second optical path 96b have the same heights and the same widths with each other, respectively. A rear focal point F of the projection lens 72 is positioned at a center between the opening portion of the first optical path 96a and the opening portion of the second optical path 96b.

Returning back to FIG. 14, in the right light emitting unit 94R, the board 98 is mounted on the other opening portion of the holder 70 in order that block 96 may be arranged within the holder 70, so that the board 98 is fixed. The right light emitting device 94R is fixed such that the second right light emitting device 80R2 and the fourth right light emitting device 80R4 are arranged in order from the left side.

When the second right light emitting device 80R2 is turned on, the irradiation light thereof is reflected on the inner plane of the first optical path 96a, travels to the opening portion thereof, and then, the irradiation light causes a second right partial region PAR2 to be formed as a projection image of an image of the opening portion. When the fourth right light emitting device 80R4 is turned on, the irradiation light thereof is reflected on the inner plane of the second optical path 96b, travels to the opening portion thereof, and then, the irradiation light causes a fourth right partial region PAR4 to be formed as a projection image of an image of the opening portion. As previously explained, even in a case that a light source image is formed on an opening portion by using a block, a right additional light distributing pattern PAR can be formed which is divided to be arranged such that the divided partial regions are arranged in a row in this order from the first right partial region PAR1 to the fifth right partial region PAR5 along the horizontal direction from the right side.

Figure 16:
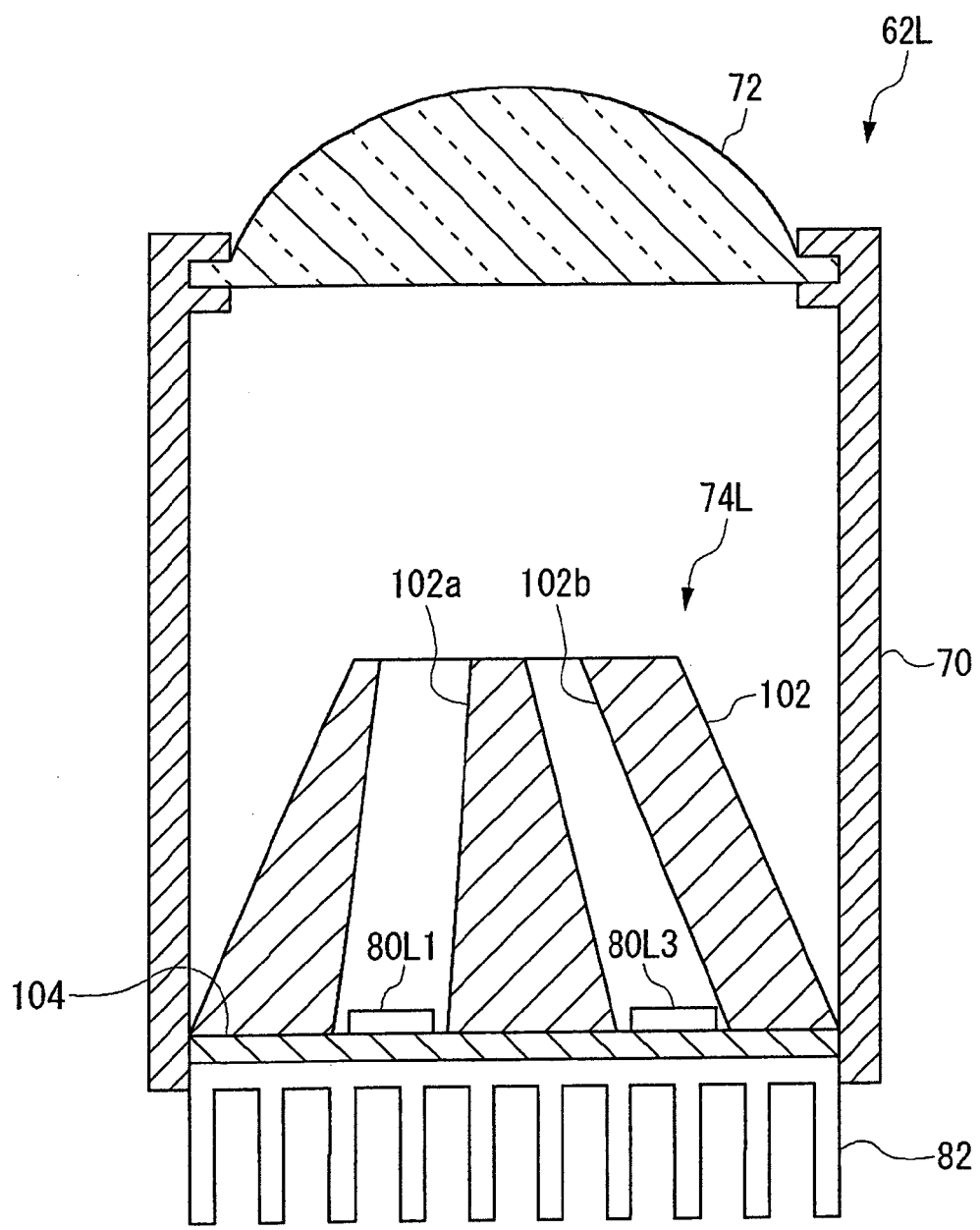
FIG. 16 is a horizontal sectional view of a second left lamp unit according to the second exemplary embodiment of the present invention.

FIG. 16 is a sectional view of the second left lamp unit 62L, taken along a horizontal plane and viewed from above. The second left lamp unit 62L includes the holder 70, the projection lens 72, and a left light emitting unit 74L.

The left light emitting unit 74L includes a block 102, a board 104, a first left light emitting device 80L1, a third left light emitting device 80L3, and a heat sink 82. A first optical path 102a and a second optical path 102b are formed in the block 102, while the first and second optical paths 102a, 102b correspond to through holes. The respective inner planes of the first optical path 102a and the second optical path 102b are constructed by mirror planes. One edge plane of the block 102, where the opening portions of these through holes are formed, is fixed to a front surface of the board 102. On the front plane of the board 104, both the first left light emitting device 80L1 and the third left light emitting device 80L3 are arranged at positions corresponding to the opening portions of the first optical path 102a and the second optical path 102b. Each of the first and third left light emitting devices 80L1, 80L3 includes a light emitting chip (not shown) such as a white light emitting diode having a square light emitting face of about 1 mm by 1 mm.

Figure 17:
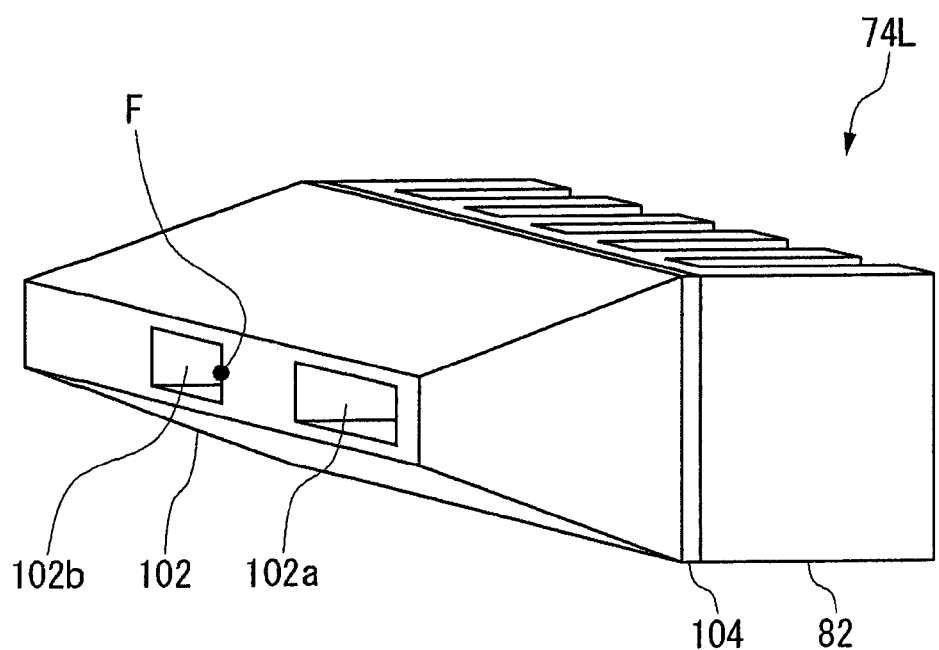
FIG. 17 is a perspective view of a left light emitting unit of the second left lamp unit of FIG. 16.

FIG. 17 is a perspective view of the left light emitting unit 74L. As shown in FIG. 17, the first optical path 102a and the second optical path 102b are arranged such that the respective opening portions thereof are arranged in a row along a lateral direction. The respective opening portions of the first optical path 102a and the second optical path 102b are formed in rectangular shapes whose heights are equal to each other, respectively. The opening portion of the first optical path 102a has a wider width than a width of the opening of the second optical path 102b. A rear focal point F of the projection lens 72 is located at an edge of the opening portion of the second optical path 102b on the side of the first optical path 102a.

Returning back to FIG. 16, in the left light emitting unit 74L, the board 102 is mounted on the other opening portion of the holder 70 in order that the block 102 may be arranged within the holder 70, so that the board 104 is fixed. The left right light emitting device 74L is fixed such that the first left light emitting device 80L1 and the third left light emitting device 80L3 are arranged in this order from the left side.

When the first left light emitting device 80L1 is turned on, the irradiation light thereof is reflected on the inner plane of the first optical path 102a, travels to the opening portion thereof, and then, the irradiation light causes a first left partial region PAL1 to be formed as a projection image of an image of the opening portion. When the third left light emitting device 80L3 is turned on, the irradiation light thereof is reflected on the inner plane of the second optical path 102b, travels to the opening portion thereof, and then, the irradiation light causes a third right partial region PAL3 to be formed as a projection image of an image of the opening portion.

Figure 18:
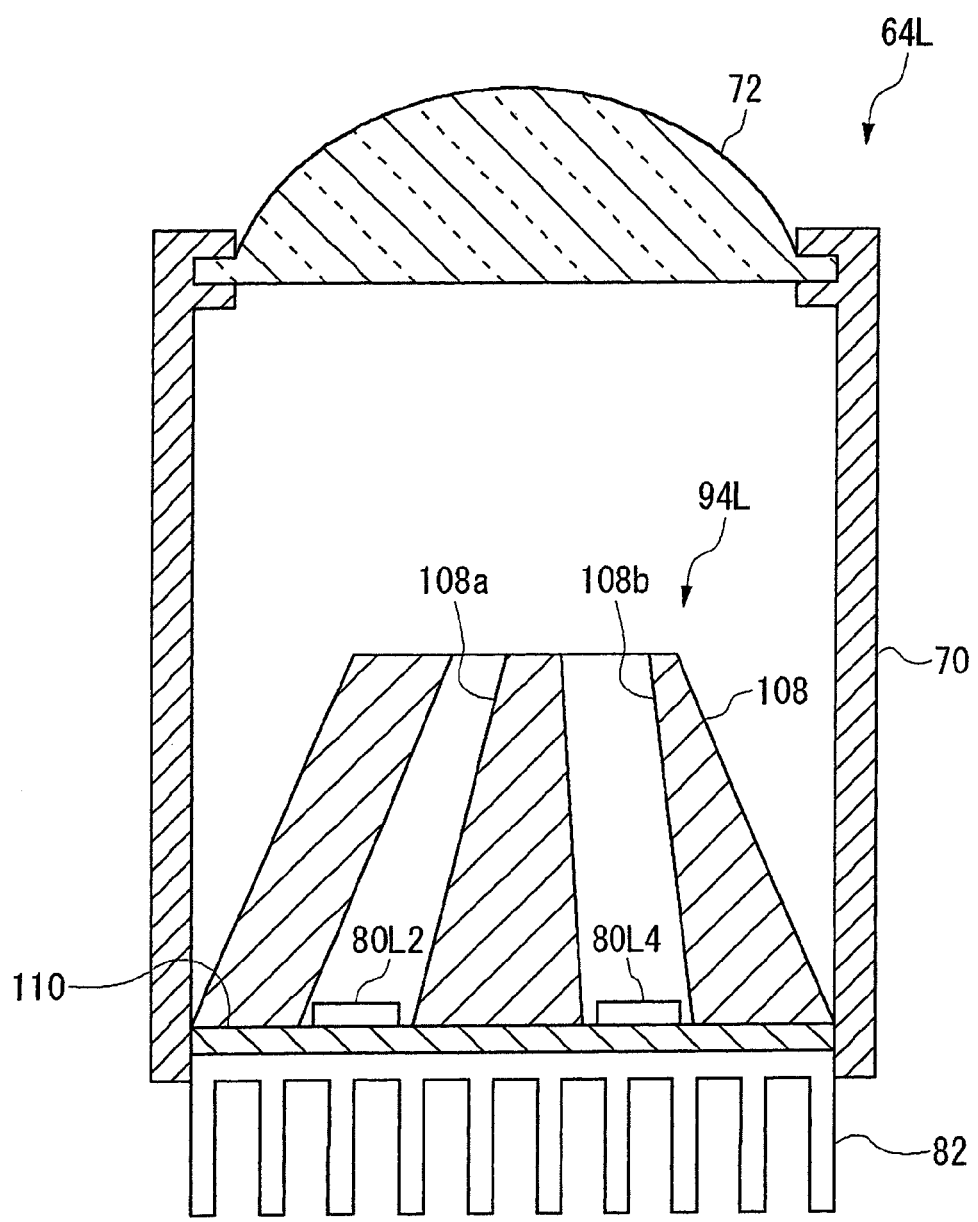
FIG. 18 is a horizontal sectional view of a third left lamp unit according to the second exemplary embodiment of the present invention.

FIG. 18 is a sectional view of the third right lamp unit 64L, taken along a horizontal plane and viewed from above. It should also be understood that the same reference numerals will be employed as those for denoting structural elements of the third right lamp unit 64L, which are similar to those of the above-described example, and descriptions thereof will be omitted. The third left lamp unit 64L includes the holder 70, the projection lens 72, and a left light emitting unit 94L.

The left light emitting unit 94L includes a block 108, a board 110, a second left light emitting device 80L2 and a fourth left light emitting device 80L4, and the heat sink 82. A first optical path 108a and a second optical path 108b are formed in the block 108, while the first and second optical paths 108a, 108b correspond to through holes. The respective inner planes of the first optical path 108a and the second optical path 108b are constructed by mirror planes. One edge plane of the block 108, where the opening portions of these through holes are formed, is fixed to a front surface of the board 110. On the front plane of the board 110, the second left light emitting device 80L2 is arranged at a position corresponding to the opening portion of the first optical path 108a, and the fourth left light emitting device 80L4 is arranged at a position corresponding to the opening portion of the second optical path 108b. Each of the left light emitting devices 80L2, 80L4 includes a light emitting chip (not shown) such as a white light emitting diode having a square light emitting face of about 1 mm by 1 mm.

Figure 19:
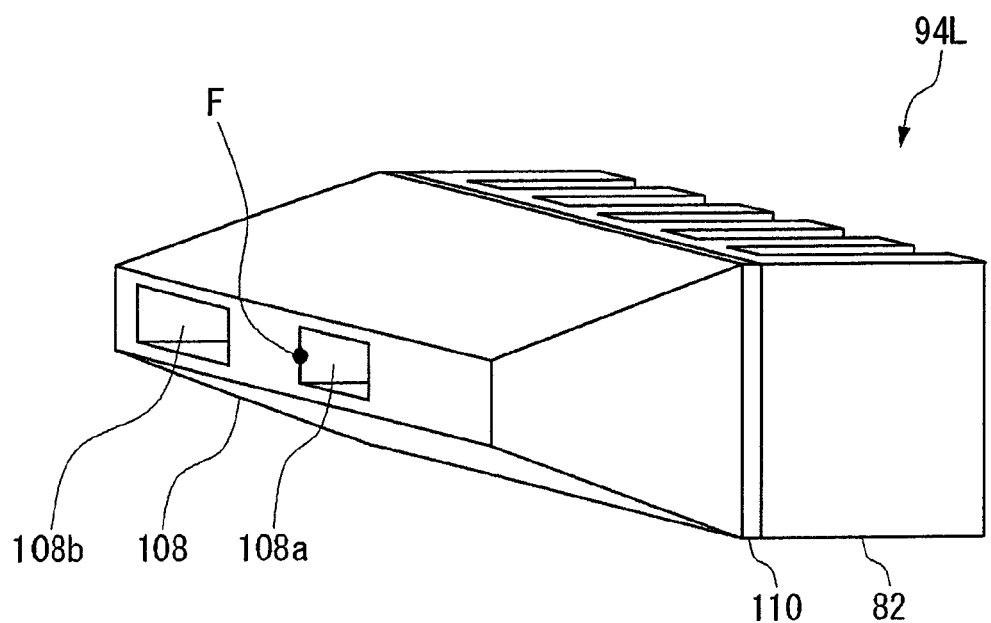
FIG. 19 is a perspective view of a left light emitting unit of the third left lamp unit of FIG. 18.

FIG. 19 is a perspective view of the left light emitting unit 94L. As shown in FIG. 19, a first optical path 108a and a second optical path 108b are arranged such that the respective opening portions thereof are arranged in a row along a lateral direction, while the respective opening portions of the first optical path 108a and the second optical path 108b are formed in rectangular shapes having the same heights with each other. The opening portion of the first optical path 108a has a width which is narrower than a width of the opening portion of the second optical path 108b. A rear focal point F of the projection lens 72 is located on an edge of the opening portion of the first optical path 108a on the side of the second optical path 108b.

Returning back to FIG. 18, in the left light emitting unit 94L, the board 110 is mounted on the other opening portion of the holder 70 in order that block 108 may be arranged within the holder 70, so that the board 110 is fixed. The left light emitting device 94L is fixed such that the second left light emitting device 80L2 and the fourth left light emitting device 80L4 are arranged in this order from the left side.

When the second left light emitting device 80L2 is turned on, the irradiation light thereof is reflected on the inner plane of the first optical path 108a, travels to the opening portion thereof, and then, the irradiation light causes a second left partial region PAL2 to be formed as a projection image of an image of the opening portion. When the fourth left light emitting device 80L4 is turned on, the irradiation light thereof is reflected on the inner plane of the second optical path 108b, travels to the opening portion thereof, and then, the irradiation light causes a fourth left partial region PAL4 to be formed as a projection image of an image of the opening portion.

As previously explained, even in such a case that a light source image is formed on an opening portion by using a block, a left additional light distributing pattern PAL can be formed which is sub-divided to be arranged such that the divided partial regions are arranged in a row in this order from the first left partial region PAL1 to the fourth left partial region PAL4 along the horizontal direction from the right side. Also, in the second exemplary embodiment, the additional light distributing pattern PA is formed such that the dividing lines of the right additional light distributing patterns PAR and the dividing lines of the left additional light distributing patterns PAL alternately appear in accordance with advances thereof along the horizontal direction. As a result, in the intermediate beam mode, such an area to which the light is not irradiated from both the second right lamp unit 38R and the second left lamp unit 38L can be reduced.

According to the exemplary embodiments described above, the vehicle headlamp apparatus can suppress the occurrence of a forward region of the vehicle in which a driver of a vehicle has difficulty seeing, and can also suppress glare experienced by preceding vehicles and pedestrians.

According to an illustrative aspect of the present invention, a vehicle headlamp apparatus is provided. The vehicle headlamp apparatus includes a low beam lamp unit which forms a low beam distribution pattern, a first additional lamp unit which forms a first additional light distributing pattern at least partially above a cutoff line of the low beam distributing pattern, a second additional lamp unit which forms a second additional light distributing pattern overlapping with the first additional light distributing pattern, and a controller. The first additional light distributing pattern includes at least one first partial region, and the first additional lamp unit is configured such that a luminous intensity of a light to be irradiated toward the first partial region is adjustable. The second additional light distributing pattern includes at least one second partial region which partially overlaps with the first partial region, and the second additional lamp unit is configured such that a luminous intensity of a light to be irradiated toward the second partial region is adjustable. The controller controls the first additional lamp unit to adjust the luminous intensity of the light to be irradiated toward the first partial region and controls the second additional lamp unit to adjust the luminous intensity of the light to be irradiated toward the second partial region.

Therefore, for example, even in a case that a preceding vehicle is detected in such a portion that the first partial region is overlapped with the second partial region, luminous intensity of irradiation light irradiated to both the first and second partial regions is decreased, and reductions of luminous intensity as to the portions other than the overlapped portion can be suppressed. As a consequence, an occurrence of a forward area of the vehicle which can be hardly viewed by the driver of the vehicle can be suppressed.

According to another illustrative aspect of the present invention, at least a portion of the first additional light distributing pattern is divided into a plurality of the first partial regions such that the plurality of the first partial regions are arranged in a row, and at least a portion of the second additional light distributing pattern that overlaps with the first additional light distributing pattern is divided in to a plurality of the second partial regions such that the plurality of the second partial regions are arranged in a row parallel to the row of the plurality of the first partial regions and such that dividing lines of the plurality of the first partial regions and dividing lines of the plurality of the second partial regions are alternately arranged. The luminous intensity is independently adjustable for each of the plurality of the first partial regions and for each of the plurality of the second partial regions.

According to such a configuration, for example, in a case that a preceding vehicle is present by bridging two partial regions, it is possible to realize such a condition that this preceding vehicle is present only in one second partial region. As a consequence, it is possible to suppress lowering of the luminous intensity of the irradiation light irradiated to areas other than one of the second partial regions. As a result, the areas for reducing the luminous intensity of the irradiation light can be reduced, as compared with such a case that a plurality of partial regions are provided such that dividing lines thereof are overlapped with each other.

According to another illustrative aspect of the present invention, the portion of the first additional light distributing pattern and the portion of the second additional light distributing pattern are formed in an area including a horizontal line, and the row of the plurality of the first partial regions and the row of the plurality of the second partial regions are extend along the horizontal line.

In a case in which a preceding vehicle and a pedestrian are present in an area including the horizontal line, the luminous intensity of the irradiation light irradiated to the area including the horizontal line is reduced, if it is advantageous, so that glare caused to the preceding vehicle and the pedestrian can be effectively suppressed.

According to another illustrative aspect of the present invention, the vehicle headlamp apparatus may further include a vehicle position detector which detects a position of a vehicle in a forward region of the vehicle headlamp apparatus. Based on the position of the vehicle detected by the vehicle position detector, the controller determines whether the vehicle is present in the first partial region, and if the vehicle is present in the first partial region, the controller controls the first additional lamp unit such that the luminous intensity of the light to be irradiated toward the first partial region is lowered. Further, based on the position of the vehicle detected by the vehicle position detector, the controller determines whether the vehicle is present in the second partial region, and if the vehicle is present in the second partial region, the controller controls the second additional lamp unit such that the luminous intensity of the light to be irradiated toward the second partial region is lowered.

According to such a configuration, when the glare caused to the preceding vehicle and the pedestrian are suppressed, it is possible to suppress lowering of luminous intensity of irradiation light irradiated to other portions than the overlapped portion between the first partial region and the second partial region. As a result, it is possible to suppress the occurrence of the forward region of the vehicle, which can be hardly viewed by the vehicle driver of the vehicle.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A vehicle headlamp apparatus comprising:
   a low beam lamp unit which forms a low beam distribution pattern having a cutoff line along an upper edge thereof;
   a first additional lamp unit which forms a first additional light distributing pattern at least partially above the cutoff line of the low beam distributing pattern, the first additional light distributing pattern comprising a plurality of first partial regions, and the first additional lamp unit being configured such that a luminous intensity of a light to be irradiated toward each of the first partial regions is adjustable;
   a second additional lamp unit which forms a second additional light distributing pattern overlapping with the first additional light distributing pattern, the second additional light distributing pattern comprising a plurality of second partial regions, each of the second partial regions partially overlapping at least one of the first partial regions, and the second additional lamp unit being configured such that a luminous intensity of a light to be irradiated toward each of the second partial regions is adjustable;
   a camera which captures an image of a forward region of a vehicle to produce image data; and
   a controller configured to control the first additional lamp unit to adjust the luminous intensity of the light to be irradiated toward each of the first partial regions and configured to control the second additional lamp unit to adjust the luminous intensity of the light to be irradiated toward each of the second partial regions based on the produced image data,
   wherein the first additional lamp unit comprises a plurality of first light emitting devices, each of the plurality of first light emitting devices generating a corresponding one of the first partial regions,
   wherein the second additional lamp unit comprises a plurality of second light emitting devices, each of the plurality of second light emitting devices generating a corresponding one of the second partial regions,
   wherein the controller is configured to individually control the plurality of first light emitting devices and individually controls the plurality of second light emitting devices such that the controller is configured to lower the luminous intensity of the light to be irradiated toward one of the first partial regions together with the luminous intensity of the light to be irradiated toward at least one of the second partial regions that partially overlaps said one of the first partial regions with the luminous intensity of the light to be irradiated toward the remaining ones of the first and second partial regions being maintained, and
   wherein a rear focal point of the first additional lamp unit is provided on a light emitting surface of one of plurality of first light emitting devices and a rear focal point of the second additional lamp unit is provided on an outer edge of one of plurality of second light emitting devices, and
   wherein in response to a position of an oncoming vehicle obtained from the produced image data being placed on a dividing line between one region of the first or second partial regions and an adjacent region of respective first or second partial regions, the controller is configured to control the first or second light emitting devices corresponding to the one and adjacent regions to lower the luminous intensity of the light to be irradiated toward the one and adjacent regions.

2. The vehicle headlamp apparatus according to claim 1 wherein at least a portion of the first additional light distributing pattern is divided into said first partial regions such that the first partial regions are arranged in a row,
   at least a portion of the second additional light distributing pattern that overlaps with the first additional light distributing pattern is divided in to said second partial regions such that the second partial regions are arranged in a row parallel to the row of the plurality of said first partial regions and such that dividing lines of the plurality of said first partial regions and dividing lines of the plurality of said second partial regions are alternately arranged, and
   the luminous intensity is independently adjustable for each of the plurality of said first partial regions and for each of the plurality of said second partial regions.

3. The vehicle headlamp apparatus according to claim 2, wherein said portion of the first additional light distributing pattern and said portion of the second additional light distributing pattern are formed in an area including a horizontal line, and
   the row of said first partial regions and the row of said second partial regions extend along the horizontal line.

4. The vehicle headlamp apparatus according to claim 1, further comprising:
   a vehicle position detector which detects a position of a vehicle in a forward region of the vehicle headlamp apparatus,
   wherein, based on the position of the vehicle, the controller determines whether the vehicle is present in said one of the first partial regions, and if the vehicle is present in said one of the first partial regions, the controller controls the first additional lamp unit such that the luminous intensity of the light to be irradiated toward said one of the first partial regions is lowered, and wherein, based on the position of the vehicle, the controller determines whether the vehicle is present in one of the second partial regions, and if the vehicle is present in said one of the second partial regions, the controller controls the second additional lamp unit such that the luminous intensity of the light to be irradiated toward said one of the second partial regions is lowered.

5. The vehicle headlamp apparatus according to claim 1, wherein the low beam lamp unit comprises a right lamp unit and a left lamp unit.

6. The vehicle headlamp apparatus according to claim 1, wherein a number of the plurality of first light emitting devices is different from a number of the plurality of second light emitting devices.

7. The vehicle headlamp apparatus according to claim 1, wherein the first additional lamp unit comprises two lamp units, at least two of the plurality of first light emitting devices mounted to one of the two lamp units, and a remainder of the plurality of first light emitting devices mounted to the other one of the two lamp units, and the second additional lamp unit comprises two lamp units, at least two of the plurality of second light emitting devices mounted to one of the two lamp units, and a remainder of the plurality of second light emitting devices mounted to the other one of the two lamp units.

8. The vehicle headlamp apparatus according to claim 7, wherein each of the two lamp units of the first additional lamp unit comprises a block in which a plurality of optical paths are formed, each of the optical paths corresponding to one of the first light emitting devices of the respective lamp unit, and the first light emitting devices are mounted at one end of the block so as to transmit light through the corresponding optical path, and each of the two lamp units of the second additional lamp unit comprises a block in which a plurality of optical paths are formed, each of the optical paths corresponding to one of the second light emitting devices of the respective lamp unit, and the second light emitting devices are mounted at one end of the block so as to transmit light through the corresponding optical path.

9. The vehicle headlamp apparatus according to claim 1, wherein an outer shape and size of the first light distribution pattern formed by the first additional lamp unit are the same as an outer shape and size of the second additional light distribution pattern formed by the second additional lamp unit.

10. The vehicle headlamp apparatus according to claim 1, wherein the first light emitting devices are arranged side by side in a row, and the second light emitting devices are arranged side by side in a row.

11. The vehicle headlamp apparatus according to claim 10, wherein each of the first light emitting devices and the second light emitting devices having a same height.

12. The vehicle headlamp apparatus according to claim 11, wherein each of the first light emitting devices and the second light emitting devices are rectangular.

13. The vehicle headlamp apparatus according to claim 1, wherein a width of each of the plurality of first light emitting devices is the same, and wherein a width of at least one of the plurality of second light emitting devices is different from a width of the remaining ones of the plurality of second light emitting devices.

14. A vehicle headlamp apparatus comprising:
a camera which captures an image of a forward region of a vehicle to produce image data;

a first headlamp comprising:
a first low-beam lamp unit comprising a light source bulb and a reflector; and
a first additional lamp unit comprising:
a first projection lens; and
at least four rectangular first light emitting devices arranged side by side in a row, each of the rectangular first light emitting devices having a same height and a same width; and
a second headlamp comprising:
a second low-beam lamp unit comprising a light source bulb and a reflector; and
a second additional lamp unit comprising:
a second projection lens;
at least three rectangular second light emitting devices arranged side by side in a row, each of the rectangular second light emitting devices having a same height, an outside device width of each of the rectangular second light emitting devices on outside ends of the row being the same and an inside device width of each of the rectangular second light emitting devices on the inside of the row being the same, the outside device width being greater than the inside device width; and
a controller which controls the first additional lamp unit and the second additional lamp unit based on the produced image data;
wherein light emitted from one of the second light emitting devices partially overlaps light emitted from a corresponding two of the first light emitting devices, and
wherein a rear focal point of the first projection lens is provided on a light emitting surface of one of the at least four rectangular first light emitting devices and a rear focal point of the second projection lens is provided on an outer edge of one of the at least three rectangular second light emitting devices,
wherein in response to a position of an oncoming vehicle obtained from the produced image data being placed on a dividing line between one region generated by one of the first light emitting devices and an adjacent region generated by an adjacent light emitting device of the first light emitting devices, the controller is configured to control the one and adjacent light emitting devices of the first light emitting devices to lower the luminous intensity of the light to be irradiated toward the one and adjacent regions, and
wherein in response to a position of an oncoming vehicle obtained from the produced image data being placed on a dividing line between one region generated by one of the second light emitting devices and an adjacent region generated by an adjacent light emitting device of the second light emitting devices, the controller is configured to control the one and adjacent light emitting devices of the second light emitting devices to lower the luminous intensity of the light to be irradiated toward the one and adjacent regions.

15. The vehicle headlamp apparatus according to claim 14, wherein an outer shape and size of a light distribution pattern formed by the first additional lamp unit are the same as an outer shape and size of a light distribution pattern formed by the second additional lamp unit.

16. A vehicle headlamp apparatus comprising:
a low beam lamp unit which forms a low beam distribution pattern having a cutoff line along an upper edge thereof;
a first additional lamp unit which forms a first additional light distributing pattern at least partially above the cutoff line of the low beam distributing pattern, the first additional light distributing pattern comprising at least one first partial region, and the first additional lamp unit being configured such that a luminous intensity of a light to be irradiated toward the first partial region is adjustable;

a second additional lamp unit which forms a second additional light distributing pattern overlapping with the first additional light distributing pattern, the second additional light distributing pattern comprising at least one second partial region which partially overlaps with the first partial region, and the second additional lamp unit being configured such that a luminous intensity of a light to be irradiated toward the second partial region is adjustable;

a camera which captures an image of a forward region of a vehicle to produce image data; and a controller which controls the first additional lamp unit to adjust the luminous intensity of the light to be irradiated toward the first partial region and which controls the second additional lamp unit to adjust the luminous intensity of the light to be irradiated toward the second partial region based on the produced image data, wherein the first additional lamp unit comprises:
   a first projection lens; and
   a plurality of first light emitting devices, each of the plurality of first light emitting devices generating a corresponding one of the at least one first partial regions, the second additional lamp unit comprises:
   a second projection lens; and
   a plurality of second light emitting devices, each of the plurality of second light emitting devices generating a corresponding one of the at least one second partial regions, and the controller individually controls the plurality of first light emitting devices and individually controls the plurality of second light emitting devices, wherein a number of the plurality of first light emitting devices is different from a number of the plurality of second light emitting devices, wherein a rear focal point of the first projection lens is provided on a light emitting surface of one of plurality of first light emitting devices and a rear focal point of the second projection lens is provided on an outer edge of one of plurality of second light emitting devices, and wherein in response to a position of an oncoming vehicle obtained from the produced image data being placed on a dividing line between one region of the at least one first or second partial regions and an adjacent region of respective at least one partial first or second partial regions, the controller is configured to control the first or second light emitting devices corresponding to the one and adjacent regions to lower the luminous intensity of the light to be irradiated toward the one and adjacent regions.

17. The vehicle headlamp apparatus according to claim 16, wherein an outer shape and size of the first light distribution pattern formed by the first additional lamp unit are the same as an outer shape and size of the second additional light distribution pattern formed by the second additional lamp unit.

18. The vehicle headlamp apparatus according to claim 16, wherein the first light emitting devices are arranged side by side in a row, and the second light emitting devices are arranged side by side in a row.

19. The vehicle headlamp apparatus according to claim 18, wherein each of the first light emitting devices and the second light emitting devices having a same height.

20. The vehicle headlamp apparatus according to claim 19, wherein each of the first light emitting devices and the second light emitting devices are rectangular.

* * * * *